United States Patent [19]
Niese

[11] Patent Number: 5,442,998
[45] Date of Patent: Aug. 22, 1995

[54] PRESSURE COOKER

[76] Inventor: Karl Niese, Auf'm Vogelheerd 31, 67745 Grumbach, Germany

[21] Appl. No.: 156,421

[22] Filed: Nov. 23, 1993

[30] Foreign Application Priority Data

Nov. 25, 1992 [DE] Germany .................. 42 39 552.6

[51] Int. Cl.⁶ .................. A47J 27/08; A47J 27/082; A47J 27/09; B65D 45/00
[52] U.S. Cl. .......................................... 99/337; 99/403; 126/369; 126/373; 220/316; 220/912
[58] Field of Search .................. 99/337, 338, 330, 342, 99/403, 340, 449; 220/208, 316, 325, 912; 126/377, 378, 373, 374, 388, 389, 369

[56] References Cited

U.S. PATENT DOCUMENTS

| | | | |
|---|---|---|---|
| 2,308,320 | 1/1943 | Stephens | 220/316 |
| 2,599,072 | 6/1952 | Schweiso | 220/316 |
| 4,024,982 | 5/1977 | Schultz | 220/316 X |
| 4,135,640 | 1/1979 | MacQuilkin et al. | 220/316 |
| 4,157,146 | 6/1979 | Svenson | 220/324 |
| 4,257,394 | 3/1981 | Zabel | 126/374 |
| 4,267,940 | 5/1981 | Wade | 220/321 |
| 4,470,515 | 9/1984 | Boehm | 220/316 |
| 4,560,143 | 12/1985 | Robinson | 251/338 |
| 4,592,479 | 6/1986 | Resende | 220/209 |
| 4,733,795 | 3/1988 | Boehm | 220/316 |
| 4,741,325 | 5/1988 | Anota | 126/389 |
| 4,796,776 | 1/1989 | Dalquist et al. | 220/203 |
| 4,899,782 | 2/1990 | Krejza et al. | 137/523 |
| 5,293,813 | 3/1994 | Schultz | 99/337 |
| 5,297,473 | 3/1994 | Thelen et al. | 99/403 |
| 5,317,959 | 6/1994 | Beluzzi | 99/337 |

Primary Examiner—Timothy F. Simone
Attorney, Agent, or Firm—McAndrews, Held & Malloy, Ltd.

[57] ABSTRACT

A pressure cooker has a lid displaceable in the vertical direction with respect to the cooker to reduce the residual pressure in the cooker and to permit opening of the cooker without any rotary movement. Tongues projecting downwards between the dome edge and the cooker edge, in conjunction with guide slots provided in clips which hold together the cooker and the lid ensure radial opening and closing movements of the clips. A centering ring located in the dome and extending into the cooker facilitates the engagement of the lid on the cooker. The centering ring carries the sealing ring and the tongues and is based away from the dome by springs supported on the dome. The dome and the centering ring are guided on one another by interengaging elements and can be locked together in the open position. On closing the pressure cooker, the locking action is eliminated and the springs bring about both the closing displacement of the clips and also the positioning of the sealing ring with respect to its sealing surfaces on the dome and the cooker.

20 Claims, 31 Drawing Sheets

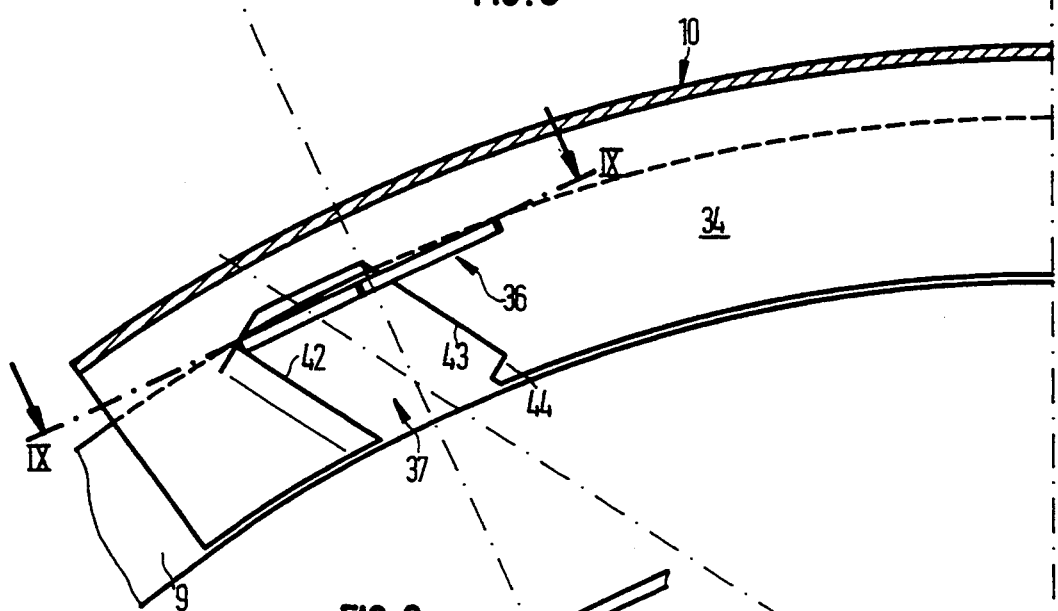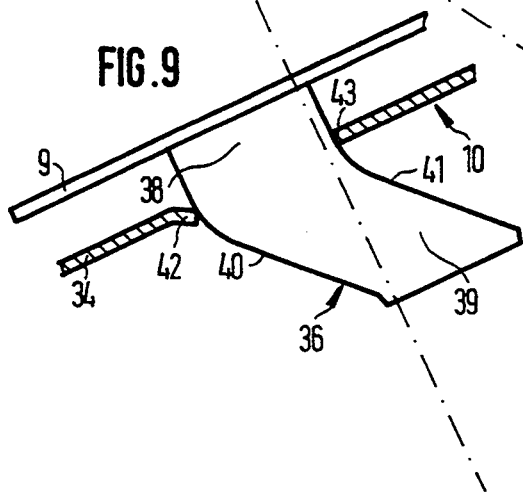

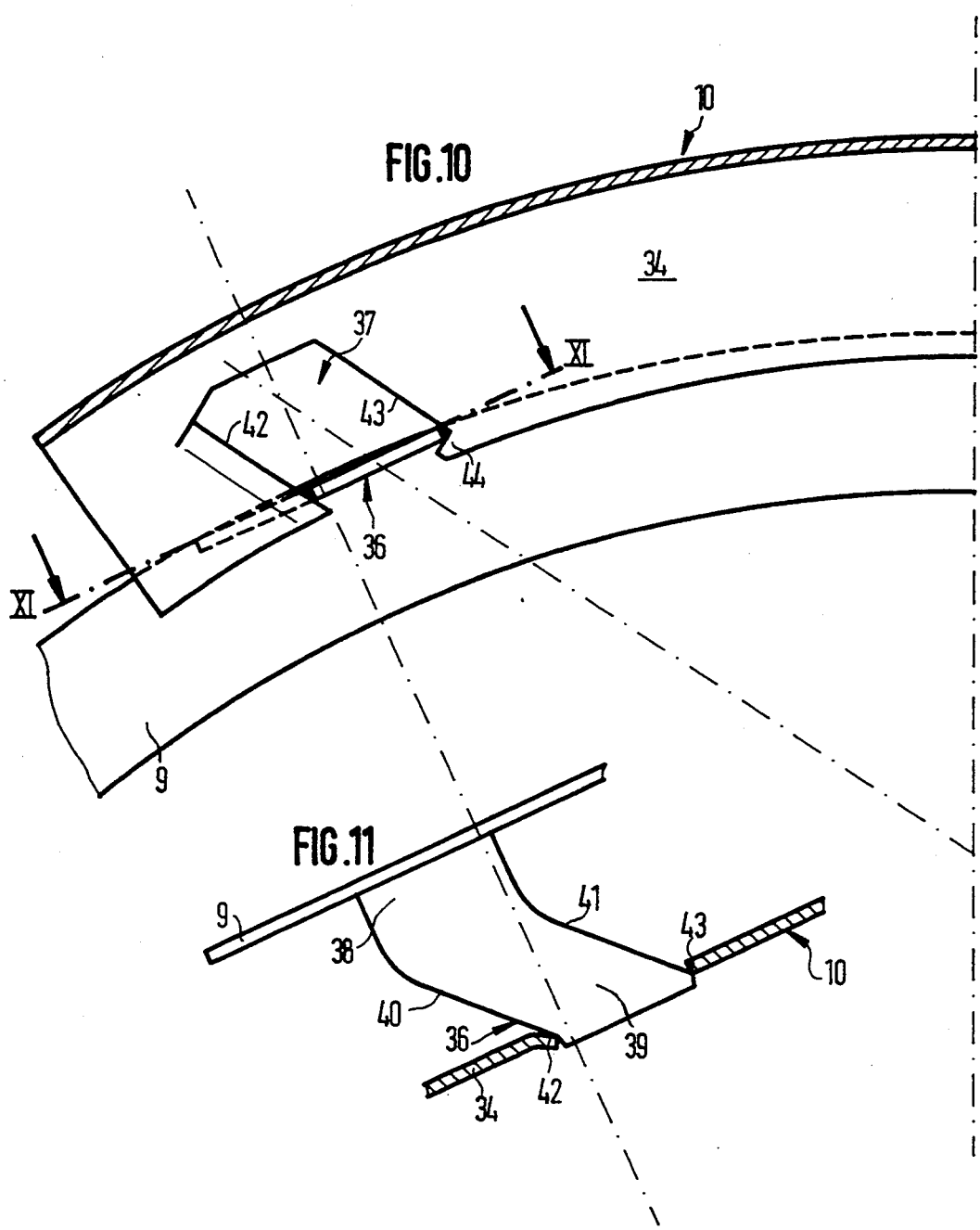

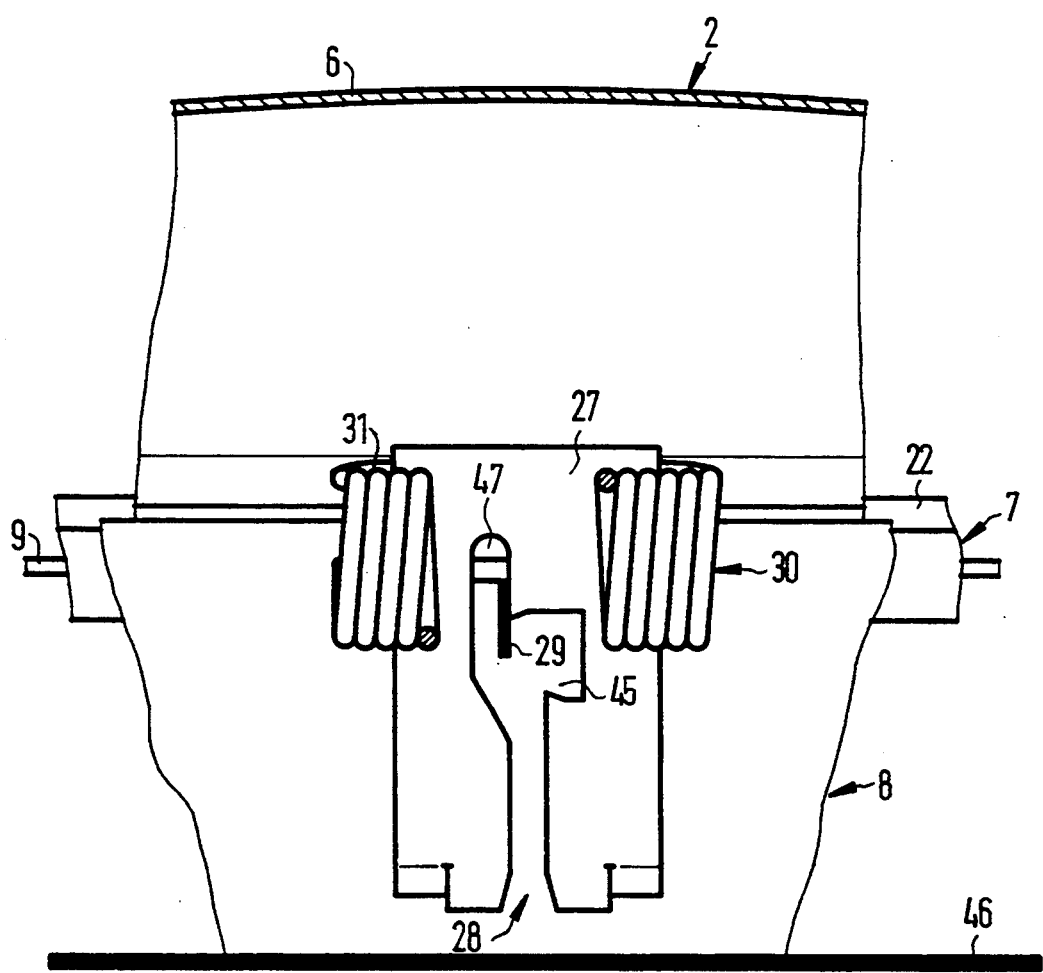

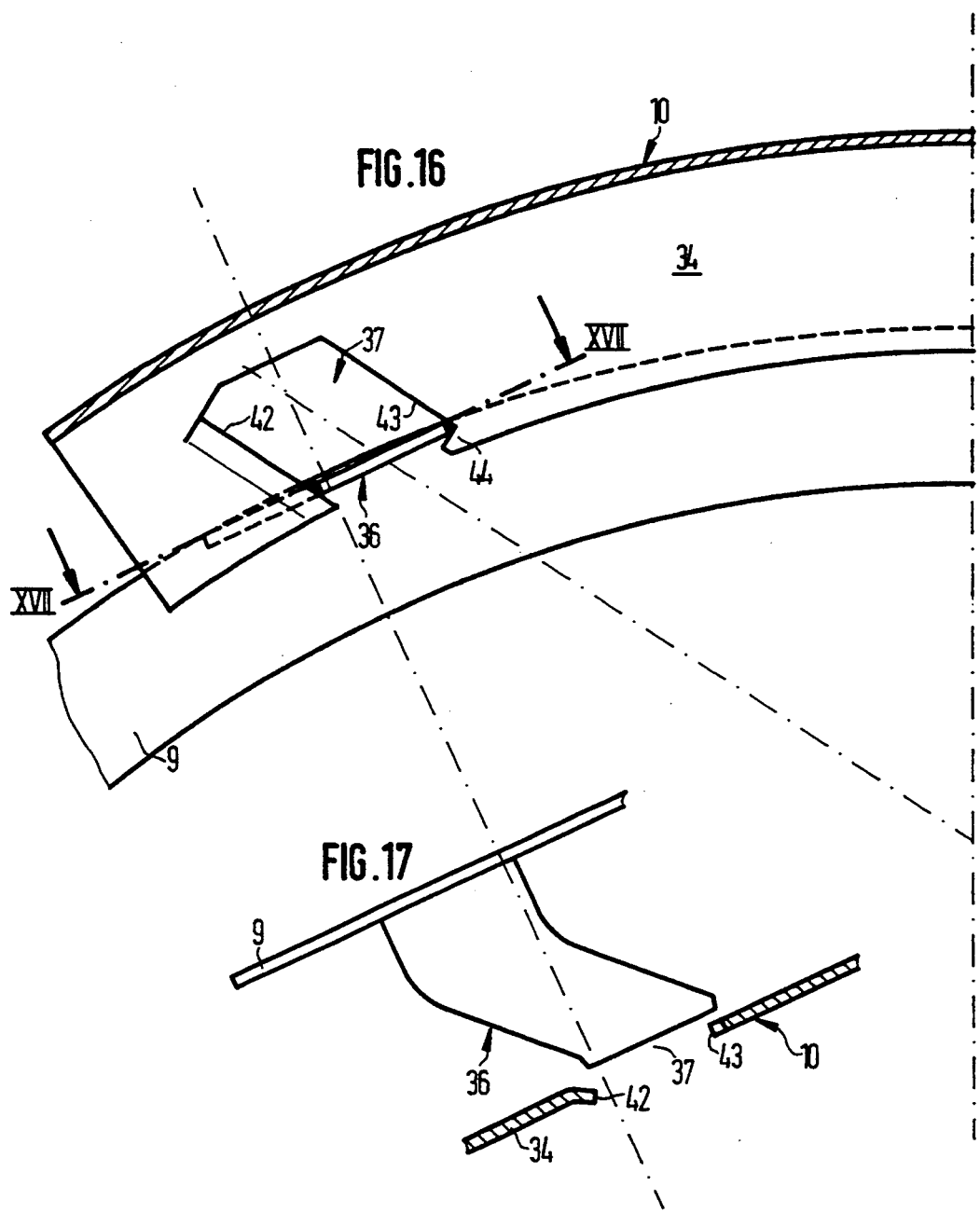

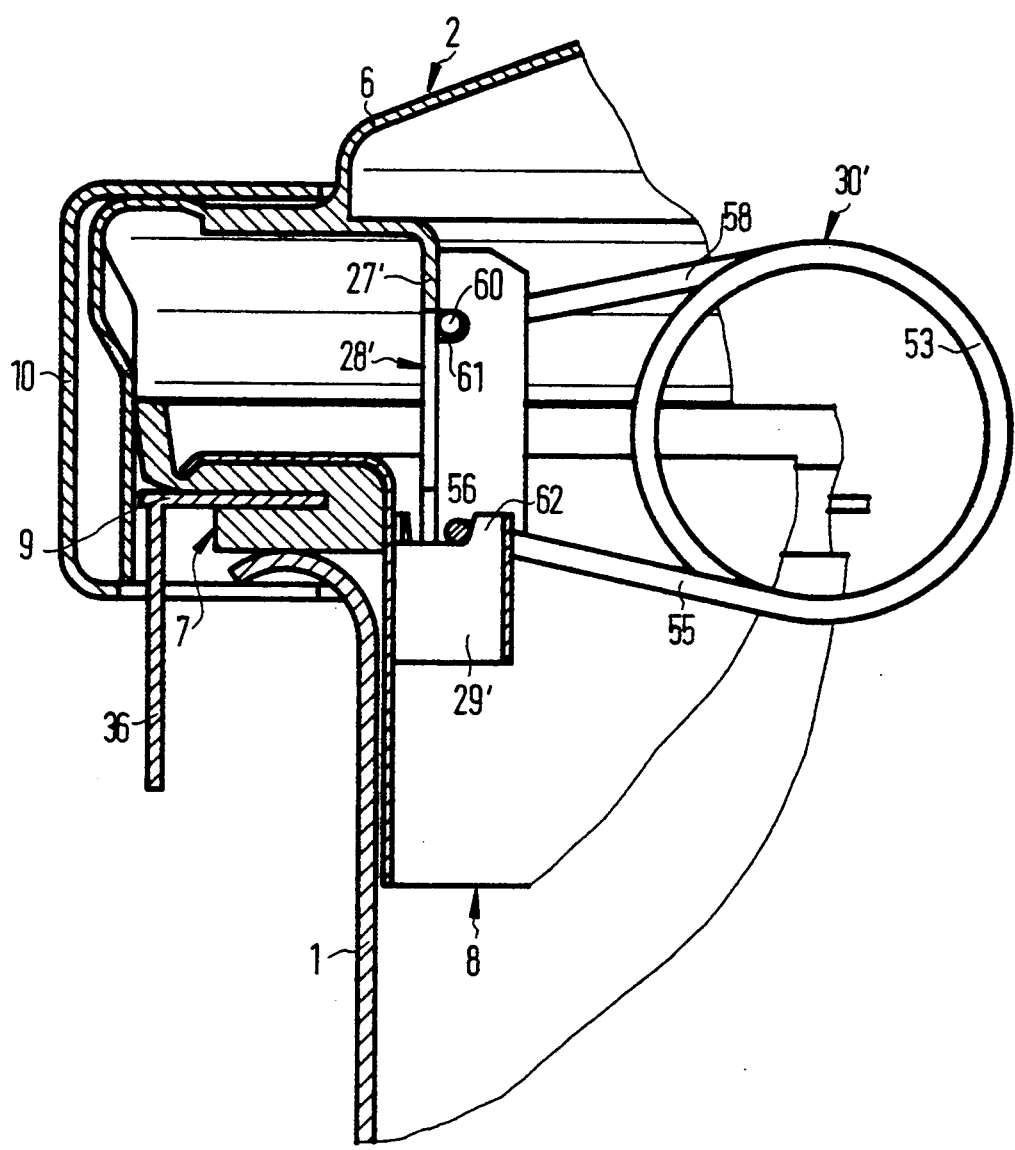

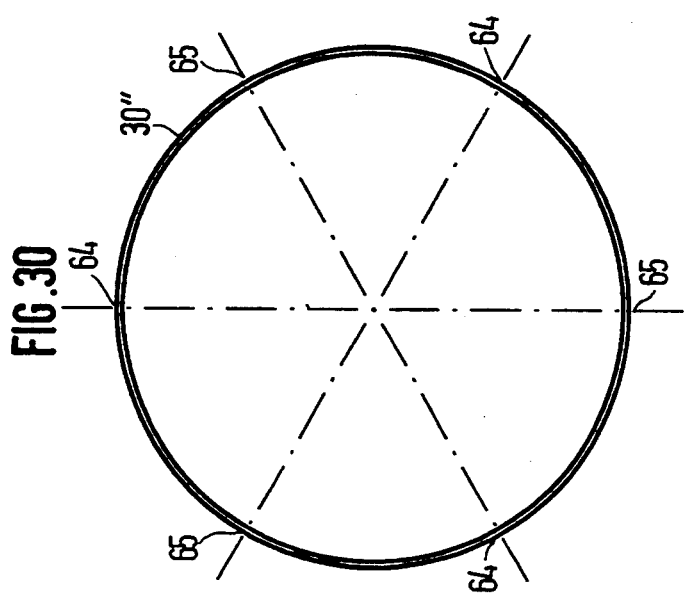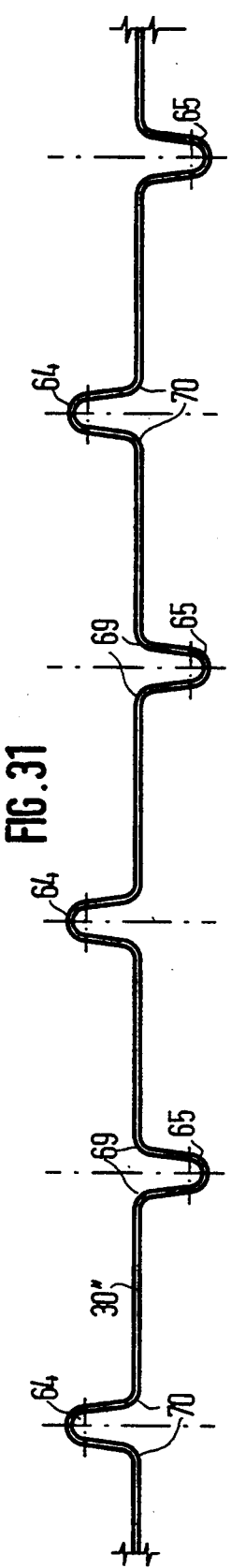

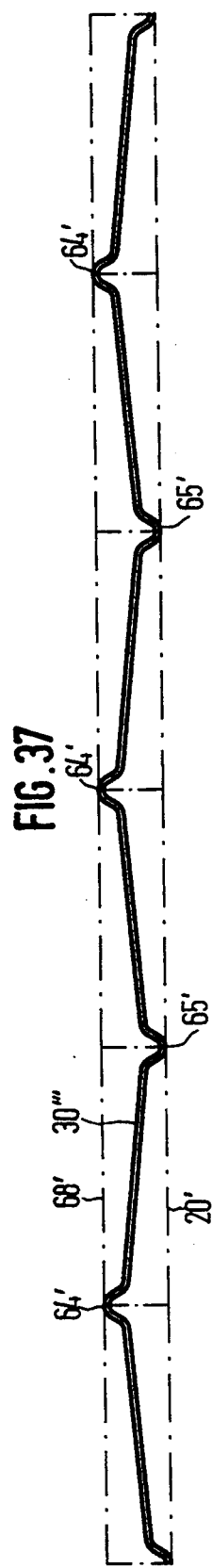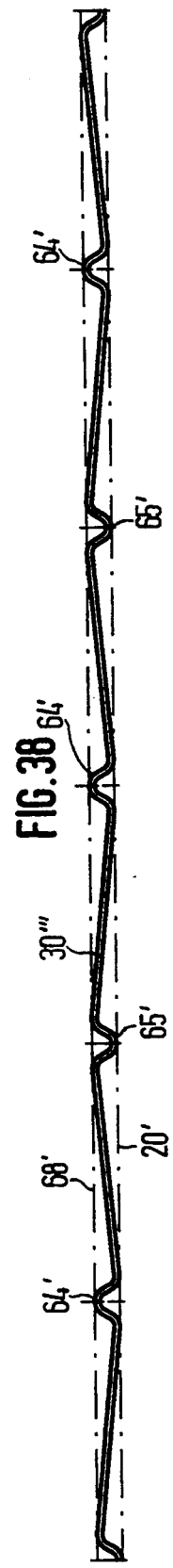

PRESSURE COOKER

TECHNICAL FIELD

The invention relates to a pressure cooker having a cooker bowl and a removably sealed lid.

BACKGROUND OF THE INVENTION

In a known steam pressure cooker as disclosed in European Patent No. 0108203 B1, following a significant pressure reduction by means of the pressure discharge valve, the lid is opened by the dome being initially pressed downwards until locking or blocking members acting between the dome and the angle profile ring also referred to as a frame, become disengaged and then the dome is turned relative to the frame for the radial opening displacement of the clips by means of the grip or handle. In order to be able to rotate the dome relative to the frame, the frictional forces keeping the frame stationary on the cooker must in all circumstances be higher than the frictional forces to be overcome for turning the dome, because otherwise the lid cannot be brought into the open position. It can prove difficult to maintain such friction ratios in a reproducible manner under all operating conditions.

On closing the cooker by oppositely directed rotation of the same with respect to the frame corresponding ratios occur. Following the closing of the clips the blocking members comprising pins and bores must be turned precisely back into the aligned position, so that the dome is again applied to the seal. If this relative setting of dome and frame is not successful, then the steam pressure cooker is not tight, so that no pressure can build up within the cooker. Another in this known steam pressure cooker is that water can penetrate though open gaps between the dome and the frame, as well as between the dome and the seal, and into the interior of the cooker when the lid is cooled under tap water prior to opening.

SUMMARY OF THE INVENTION

The object of the invention is to provide a steam pressure cooker which is easy to use and operates reliably and in which it is not possible for cooling water flowing via the dome to penetrate into the interior of the cooker. These and other objects are achieved by a pressure cooker comprising (a) a cooker bowl comprising a base from which a cylindrical side extends to an upper circular flange like pouring edge of the bowl, (b) a lid for said bowl comprising
 (i) a circular dome means provided with a downwardly directed circumferential wall of greater diameter than said pouring edge whereby said lid is axially movable with respect to said bowl,
 (ii) a handle fixedly and concentrically located on said dome means,
 (iii) a venting and safety valve for releasing pressure from said bowl mounted to said dome means,
 (iv) a centering ring having a first portion of a cylindrical shape and smaller diameter than said cylindrical bowl side and locatable within said bowl, and a second portion extending radially outwards from said first portion towards but spaced radially by a radial spacing from an inner surface of said circumferential wall of said dome means.
 (v) an annular sealing ring located within said circumferential wall of said dome means below said second portion of said centering ring so as to seat against said pouring edge of said bowl under pressure from within said bowl,
 (vi) downwardly directed closure elements fixed to said sealing ring, said elements extending through a radial spacing between said wall of said dome means and said pouring edge,
 (vii) clip means arranged to engage around said dome means and said pouring edge of said bowl and movable from a radially inward clipping position to a radially outward unclipping position free of said pouring edge, said clip means being mounted to said dome means and axially immobile therewith,
 (viii) said clip means being provided with guide elements which are engaged with said closure elements to control the radial movement of said clip means and to urge said clip means radially outwards on pressure of said dome means downwardly towards said pouring edge of said bowl,
 (ix) resilient means acting between said dome means and said centering ring so as to urge said sealing ring carrying said closure elements axially away from said dome means,
 (x) said sealing ring having a radially outwardly sealing lip urgable by internal pressure within said cooker onto said inner surface of said circumferential wall of said dome means into sealing engagement therewith, an upper extension of said inner surface being so formed that on movement of said dome means downwards towards said pouring edge said sealing engagement is eliminated,
 (xi) locking means acting between said dome means and said centering ring to retain said dome means and centering ring together against the action of said resilient means, whereby the lid is released from the bowl by depressing the lid, releasing the pressure within the bowl past the sealing lip as the clip means are caused to move radially outwards by interaction between the closure elements and guide elements on the clip means to a position where the clip means clear the pouring edge of the bowl and are locked open for the lid to be removed from the bowl.

According to the basic principle of the invention the residual pressure reduction and the opening and closing of the pressure cooker take place substantially in a single vertical movement of the dome. This is made possible by the special construction of the dome, the arrangement of a centering ring retaining the sealing ring and partly extending into the dome and partly into the cooker, the fitting of downwardly directed closure elements extending through a radial gap between the circumferential wall of the dome and the cooker edge and which engage on the clips and the fitting jointly displaceably engaging, spring-loaded elements fixing the opening position following a substantially vertical movement by locking and acting between the centering ring and the dome or between the clips and the dome. The arrangement is such that on closing the cooker and after eliminating the locking action, by slight rotation of the dome with respect to the centering ring or clips, said elements ensure that the springs, tensioned on opening, automatically bring about the sealing of the steam pressure cooker while at the same time clamping the edges of the lid and the cooker. The pressure cooker according to the invention is reliable and easy in operation, and the circumferential wall of the dome engaging over the cooker edge prevents the penetration of cooling water into the cooker interior.

Preferably an upper extension of the circumferential wall of the dome is enlarged compared to its lower inner surface so that during the opening process the sealing lip of the sealing ring engaging on the cylindrical inner surface is partially raised from the circumferential wall in order to reduce the residual pressure. These features also ensure that the sealing action can be brought about again during the closing process by a vertical relative movement and without any prior rotary movement.

For the sealing of the dome of the lid engaged by sealing ring on the cooker edge, said sealing ring is advantageously constructed so that the sealing lip of the rings extends upwards through a radial spacing between the centering ring and the inner surface of the circumferential wall of the dome. The sealing lip has an inner surface exposed to the internal pressure, which ensures a tight pressing action of the sealing lip onto the cylindrical inner surface under the action of the internal pressure. The sealing ring with its sealing lip and the centering ring retaining the sealing ring form a structure displaceable in the manner of an annular piston on the cylindrical inner surface.

Preferably the sealing ring is formed as an annular piston-like structure which also includes a thrust ring, which to a certain extent reinforces the sealing ring held on the centering ring and which is flexibly supported from below on the sealing lip connected to the sealing ring. The sealing ring and thrust ring are appropriately detachable from one another, the sealing ring being engageable on the inner circumference of the thrust ring. The centering ring, the thrust ring and the interposed sealing ring have diameters which are matched to one another in such a way that said parts act in the manner of a unit during cooker operation, but can nondestructively be separated from one another for cleaning purposes and then reassembled. The fitting of the thrust ring offers the advantageous possibility, of fixing the closure elements thereto.

In a preferred construction of the closure mechanism controlling the radial displacement of the clips as a function of the axial movement of the dome, the radial displacements of the clips are brought about by a wedge or key action, two wedge or key movements being superimposed, namely an axially directed movement with respect to the cooker axis and a movement directed radial thereto.

The axially non-displaceable arrangement of the clips on the dome can take place in simple manner by spanning legs of the clips a distance corresponding the height of the circumferential wall. This ensures that the clips directly follow any axial movement of the dome.

In a particularly appropriate arrangement the centering ring is guided on the dome and is lockable with respect to the done in the open position by providing links extending down from the dome to the centering ring into which noses from the centering ring engage and lock onto recesses in the links. The arrangement can be such that the interengaging elements of centering ring and dome can be constructed in matching manner to the closure elements comprising tongues and guide slots. This latter arrangement prevents unintentional detachment or disassembly of the lid because an increased force must be applied to the dome so as not only to counteract the spring tension, but also bring about an elastic deformation of the sealing lip of the sealing ring until the tongues pass out of the guide slots of the clips. Only then can the lips be drawn out in the radially outwards direction.

On each link there may be provided a spring formed as a helical torsion spring whose ends act between the link and an associated nose. This provides an appropriate construction of the springs acting both on the dome and the centering ring. The helical torsion springs used produce transverse forces, which the opening locking of the interengaging elements of centering ring and dome.

According to another embodiment the link slots have an inclined wall forming the locking recess, thus the interengaging elements of centering ring and dome, during the opening displacement of the dome, force a relative rotation between the centering ring and dome having a limited rotation angle until locking takes place in the open position. During the closing displacement of the dome the locking action is cancelled out by a corresponding slight relative rotation in the opposite direction.

The springs advantageously used in this embodiment comprise two spaced helical coils coiled in opposite directions. These must not assist the locking process between the dome and the centering ring by transverse forces. Therefore there is no need to overcome any significant transverse spring forces on eliminating the locking action.

In an alternative embodiment, the noses for the clips in the open position are advantageously provided at the bottom on the circumferential wall of the dome, while the associated link slots are located in the lower leg of the clips. Thus, in a very simple and operationally reliable manner, a slight rotation of the dome with respect to the clips in the open position provides a direct latching in between the dome and the clips with the springs tensioned. This latching action can be cancelled out again for closing the cooker by an equally small rotation of the dome in the opposite direction.

A spring construction ideally suited for the above alternative embodiment but also for a previously described embodiment is an annular, one-piece bent spring which takes up only a little space on the lid, and which can be easily cleaned, fitted and removed.

BRIEF DESCRIPTION OF THE DRAWINGS

The invention is described in greater detail hereinafter relative to non-limitative embodiments and with reference to the attached drawings, wherein is shown:

FIG. 8 A partial view from below of a clip and the thrust ring in the relative position illustrating the closed position.

FIG. 9 A part section along line IX—IX in FIG. 8.

FIG. 10 A view from below similar to FIG. 8, but in the relative position of clip and thrust ring illustrating the open position of the cooker.

FIG. 11 A part section along line XI—XI in FIG. 10.

FIG. 15 A sectional view similar to FIGS. 6 and 13, but only showing the lid in the position for its disassembly according to FIG. 14.

FIG. 16 A view from below similar to FIGS. 8 and 10, but in the lid disassembly position.

FIG. 17 A part section along line XVII—XVII of FIG. 16.

FIG. 18 A sectional view similar to FIG. 5, but of a second embodiment of the invention with interengaging elements of centering ring and dome, including another embodiment of the springs acting between said parts, with the elements in the closed position.

FIG. 30 A plan view of the spring used in the third embodiment according to FIGS. 24 to 29.

FIG. 31 A cut-open, stretched side view of the untensioned spring of FIG. 30.

FIG. 37 A side view similar to FIG. 32 of the pretensioned spring according to the fourth embodiment of FIGS. 35 and 36.

FIG. 38 A side view of the block-tensioned spring similar to FIG. 33 corresponding to the spring variant of the fourth embodiment.

DESCRIPTION OF THE PREFERRED EMBODIMENTS

Figure 1:
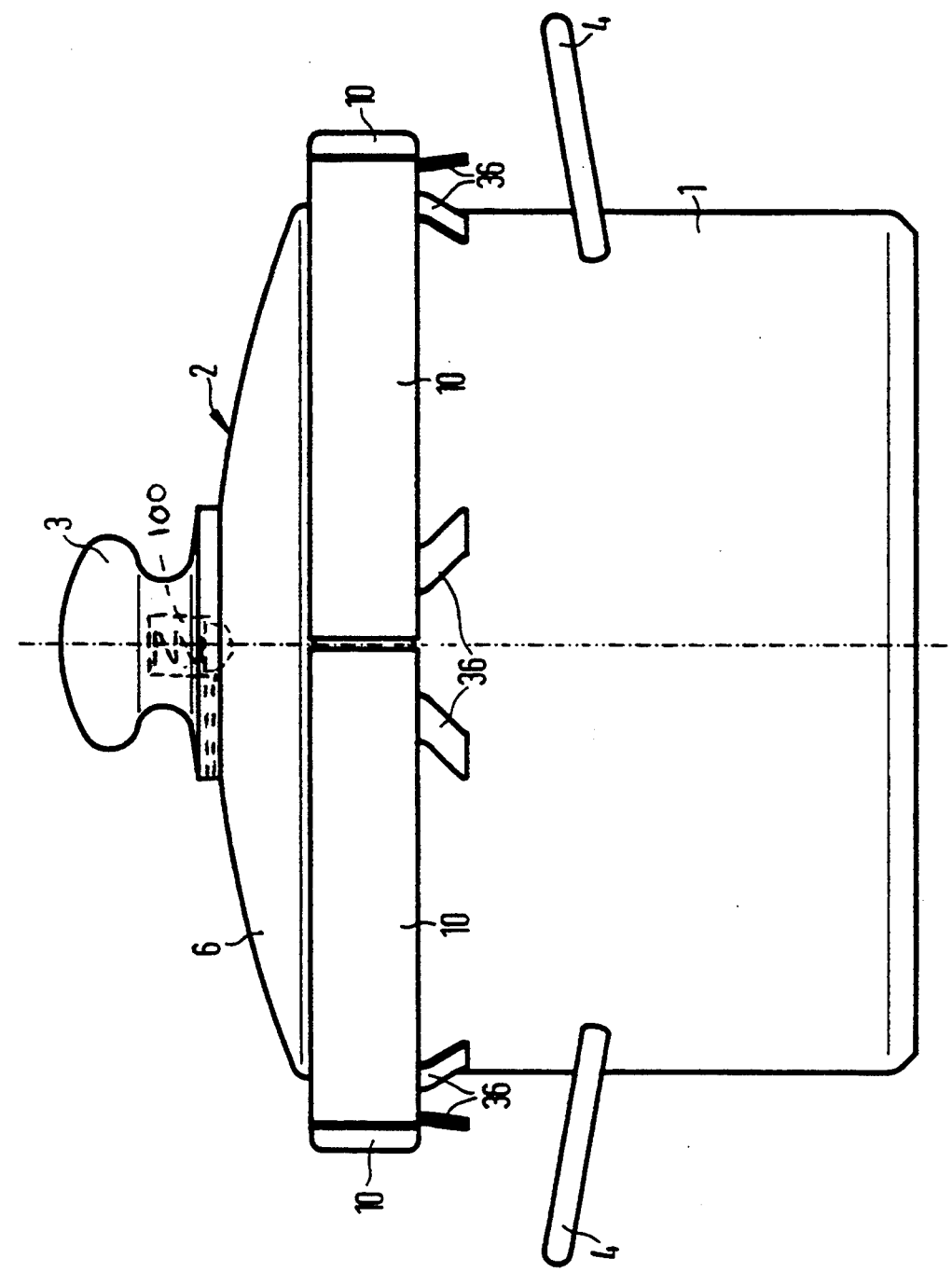
FIG. 1 A side view of a closed pressure cooker according to a first embodiment of the invention.
Figure 2:
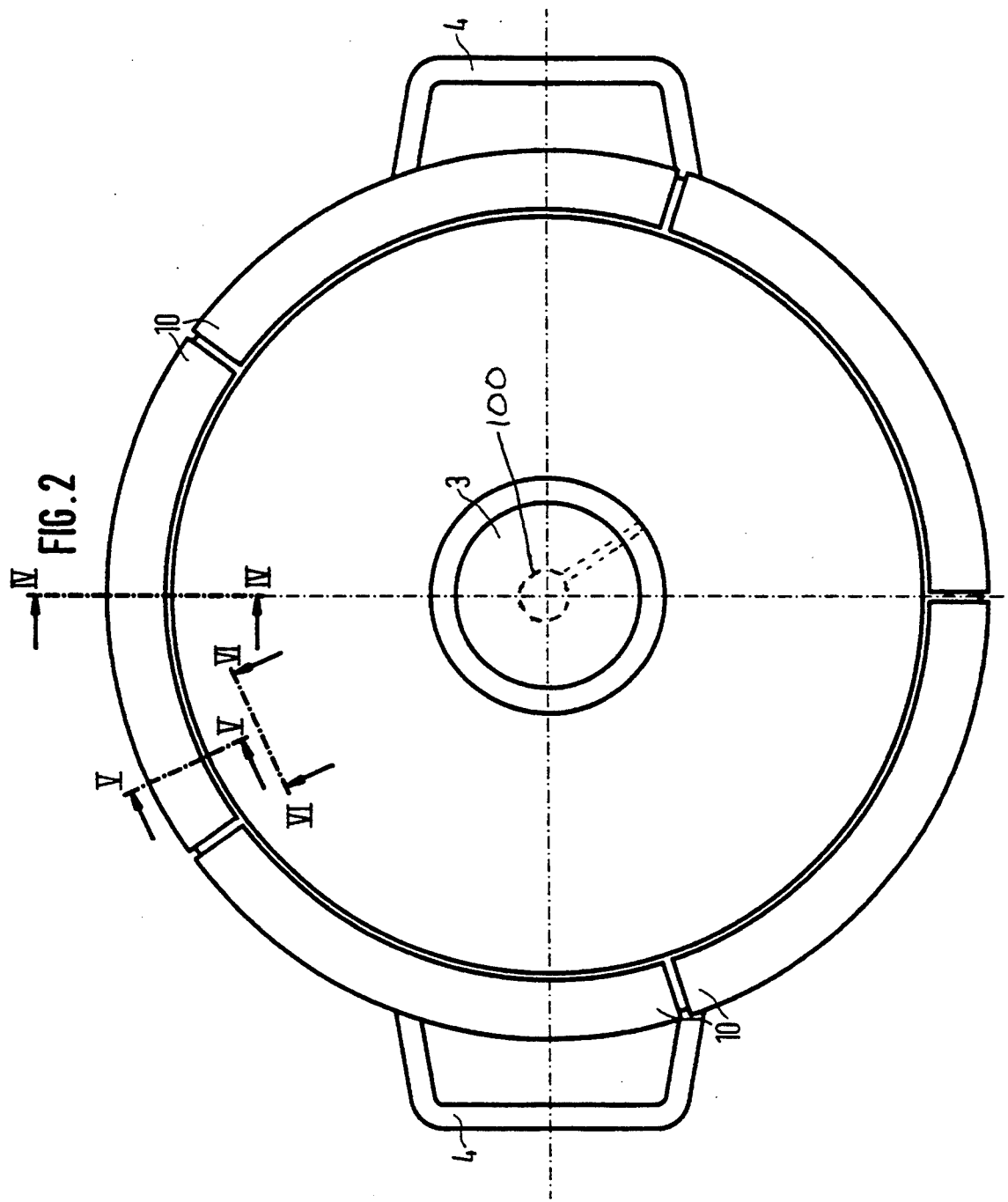
FIG. 2 A plan view of the pressure cooker according to FIG. 1.

For illustrating the first embodiment of the pressure cooker reference is firstly made to FIGS. 1 to 23. For illustrating details the drawings are subdivided into two groups having different scales. FIGS. 1 to 3 and 7 of the first group are shown with the same scale. This also applies to FIGS. 4,5,6, and 8 to 23 of the second group, which are shown on a larger scale than the first group.

The pressure cooker comprises the actual cooker bowl 1 forming the cooking product container and the lid designated overall by 2. The lid 2 is provided with a grip or handle 3 fitted concentrically thereto. The cooker bowl 1 also has side handles 4. There are also a pressure limiting, safety, waste and vent valve 100, as well as optionally a pressure reading, which are preferably housed in the grip 3. The use of pressure relief valves in pressure cookers are well known in the art, and, hence, the valve 100 will not be explained in greater detail. Examples of pressure valves are shown in U.S. Pat. Nos. 4,733,795; 4,796,776 and 4,741,325, the disclosures of which are specifically incorporated by reference herein.

Figure 4:
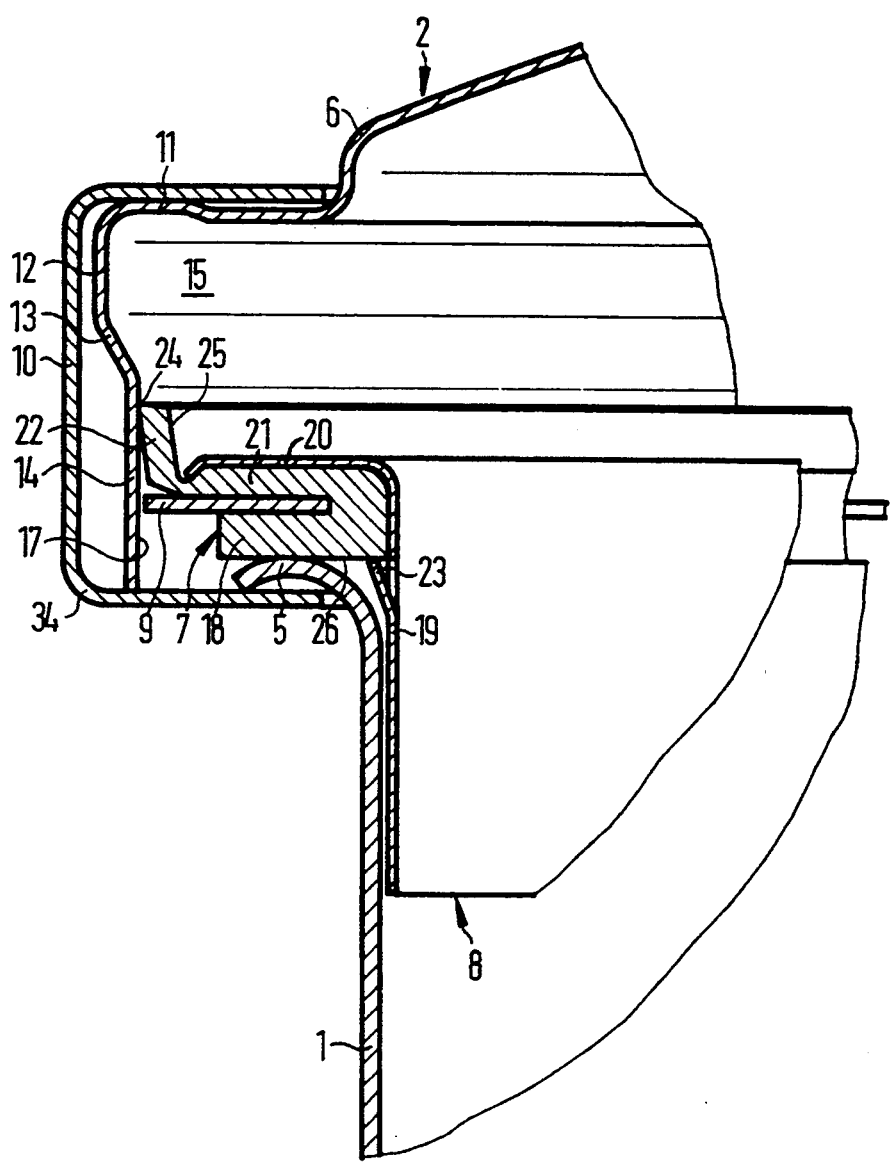
FIG. 4 A part sectional view corresponding to line IV—IV of FIGS. 2 and 3.

As can be gathered from FIG. 4, for example the substantially hollow cylindrical cooker bowl 1 has a flange-like, all-round uniform pouring edge 5, which is upwardly convex in cross-section. Besides providing good pouring characteristics, this shape provides a small, upper supporting surface which produces high surface pressure for sealing the pressure cooker.

The lid 2 essentially comprises a dome 6, a sealing ring 7 made from a rubber elastic material cooperating with the pouring edge 5, a centering ring 8, a thrust ring 9 and a plurality of clips 10. The clips 10 have a U-shaped cross-section and engage ground both the marginal area of the dome 6 and also the pouring edge 5 and in this way hold the cooker 1 and lid 2 together against the action of the overpressure produced in the cooker when cooking. As can be gathered from FIGS. 2, 3 and 7, in the represented embodiment there are five clips 10 with the same dimensions on the circumference of the lid 2. The clips 10 are constructed as ring sectors, whose adjacent ends are not in contact with one another, even when the steam pressure cooker is closed.

On its inner .marginal area the dome 6 has a supporting edge 1! for the upper legs of the clips 10. To the supporting edge 11 is connected a downwardly pointing wall portion 12, which is followed by a downwardly and inwardly directed, i.e. conical, transition portion 13, which is in turn followed by a cylindrical portion 14.

The portions 12, 13 and 14 form a through side wall of the dome 6 and have an overall height, which is only slightly smaller than the internal height of the U-shaped profile of the clips 10. The wall portion 12 has a larger internal diameter than the cylindrical portion 14, so that an enlargement or bulge 15 is formed within the dome 6 in the vicinity of the wall portion 12. Within the enlargement 15 there is at least one web 16 (FIGS. 5, 12, 14, 18, 20, 22) and preferably several such circumferentially distributed webs, which are in each case connected in bottom aligning manner with the cylindrical inner surface 17 of the cylindrical portion 14 and terminate at the top on the inner surface of the wall portion 12 at a distance from the inner surface of the supporting edge 11.

The sealing ring 7 is stabilized by the thrust ring 9 inserted in the circumferential groove of said sealing ring. The external diameter of the thrust ring 9 is smaller than the internal diameter of the cylindrical portion 14. The thrust ring 9 projects over the lower leg 18 of the sealing ring 7. The external diameter of the lower leg 18 is much smaller than the internal diameter of the cylindical portion 14 of the dome 6. The centering ring 8 inwardly supports the sealing ring 7 by a hollow cylindrical wall 19 and upwardly supports it by a flange 20. The flange 20 engages over the upper leg 21 of the sealing ring 7, but terminates in radially spaced manner with respect to the inner surface 17 of the cylindrical portion 14. The upper leg 21 passes through the gap between the outer edge of the flange 20 and the upper surface of the thrust ring 9 and at this point is preferably reduced in thickness in order to increase the flexibility of a sealing lip 22 connected to the flange 20. The sealing ring 7, the thrust ring 9 and the centering ring 8 are fixed together by the flange 20 and barbs 28 located externally on the hollow cylindrical wall 19 and preferably shaped therefrom. The external diameter of the hollow cylindrical wall 19 is smaller than the internal diameter of the cooker, so that the lid 2 can be placed on and removed from the cooker 1 guided and centered by its centering ring 8 engaging in the cooker opening.

Figure 5:
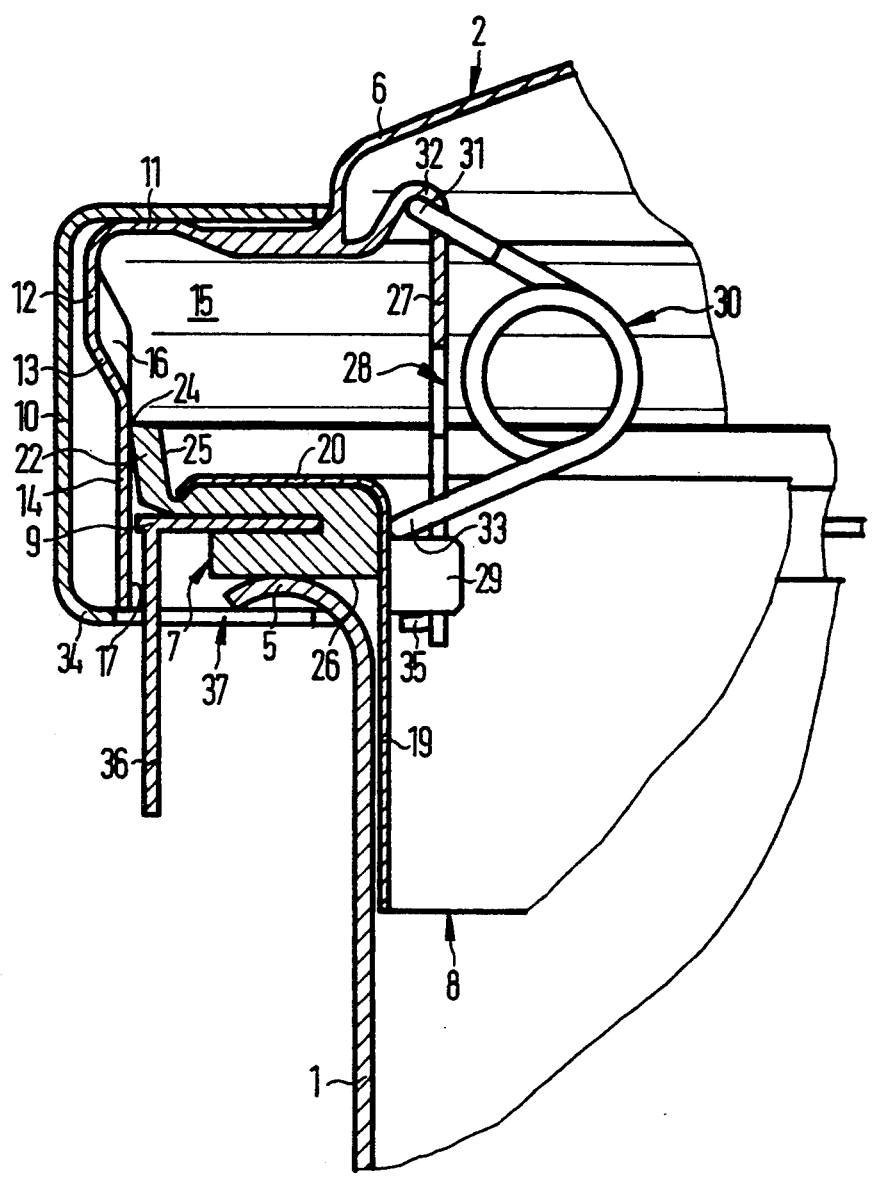
FIG. 5 A part sectional view corresponding to line V—V of FIGS. 2 and 3 with the represented elements in the closed position.

The sealing lip 22 slopes upwards and outwards and, as a result of the rubber elastic material characteristics of the sealing ring 7, engages tightly with its upper sealing edge 24 on the cylindrical inner surface 17 of the dome 6 when the cooker is closed (FIGS. 4 and 5). The sealing lip 22 has an inner surface 25 exposed to the internal pressure of the cooker. The inner surface 25 ensures a tight pressing action of the sealing lip 22 onto the cylindrical inner surface 17 as a result of the internal pressure acting on the inner surface 25. In particular, the overpressure produced during cooking in the steam pressure cooker acts on the inner surface 25 of the sealing lip 22, which increases the contact pressure of the sealing edge 24 on the cylindrical inner surface 17 and completely and reliably seals the cooker at this point with respect to the external atmosphere. The sealing ring 7 and the centering ring 8 form a structure displaceable in the manner of an annular piston with respect to the annular inner surface 17 of the dome 2. Because the upper wall portion 12 of the circumferential wall of the dome 2 is enlarged compared to its lower cylindrical portion 14, the sealing lip 22 partially raises from the cylindrical inner surface 17 as the lid sealing ring moves upwardly within the dome during the opening process. When the sealing lip raises from the cylindrical inner surface 17 pressure can escape out past the sealing ring, thereby reducing the internal pressure of the cooker. Conversely, these features ensure that the sealing action can be brought about again during the closing process by a vertical movement of the dome 2 relative to the sealing ring 7 and without any prior rotary movement.

The lower sealing surface 26 of the sealing ring 7 engages on the pouring edge 5 and is tightly pressed onto the same by spring tension in the way described hereinafter when the steam pressure cooker is closed. The pouring edge 5 is formed with an upwardly directed, convex curvature which not only facilitates pouring from the bowl, but also provides a circumferentially directed, uniform sealing rib which engages the sealing ring 7 with a high surface pressure, increasing the sealing action as a function of the internal pressure when the pressure cooker is closed. As the diameter of the cylindrical inner surface 17 is larger than the diameter of the circular supporting or bearing line between the sealing surface 26 and the pouring edge 5, the difference resulting from the circular faces of these two different diameters forms a circular ring surface on which the overpressure occurring in the cooker during cooking also acts. Therefore the contact pressure of the sealing surface 26 on the pouring edge 5 is increased, so that here again the steam pressure cooker is reliably and completely sealed at this point with respect to the external atmosphere.

An embodiment of the interengaging elements of centering ring 8 and dome 2 is shown in different positions in FIGS. 5, 6 and 12 to 15.

Figure 6:
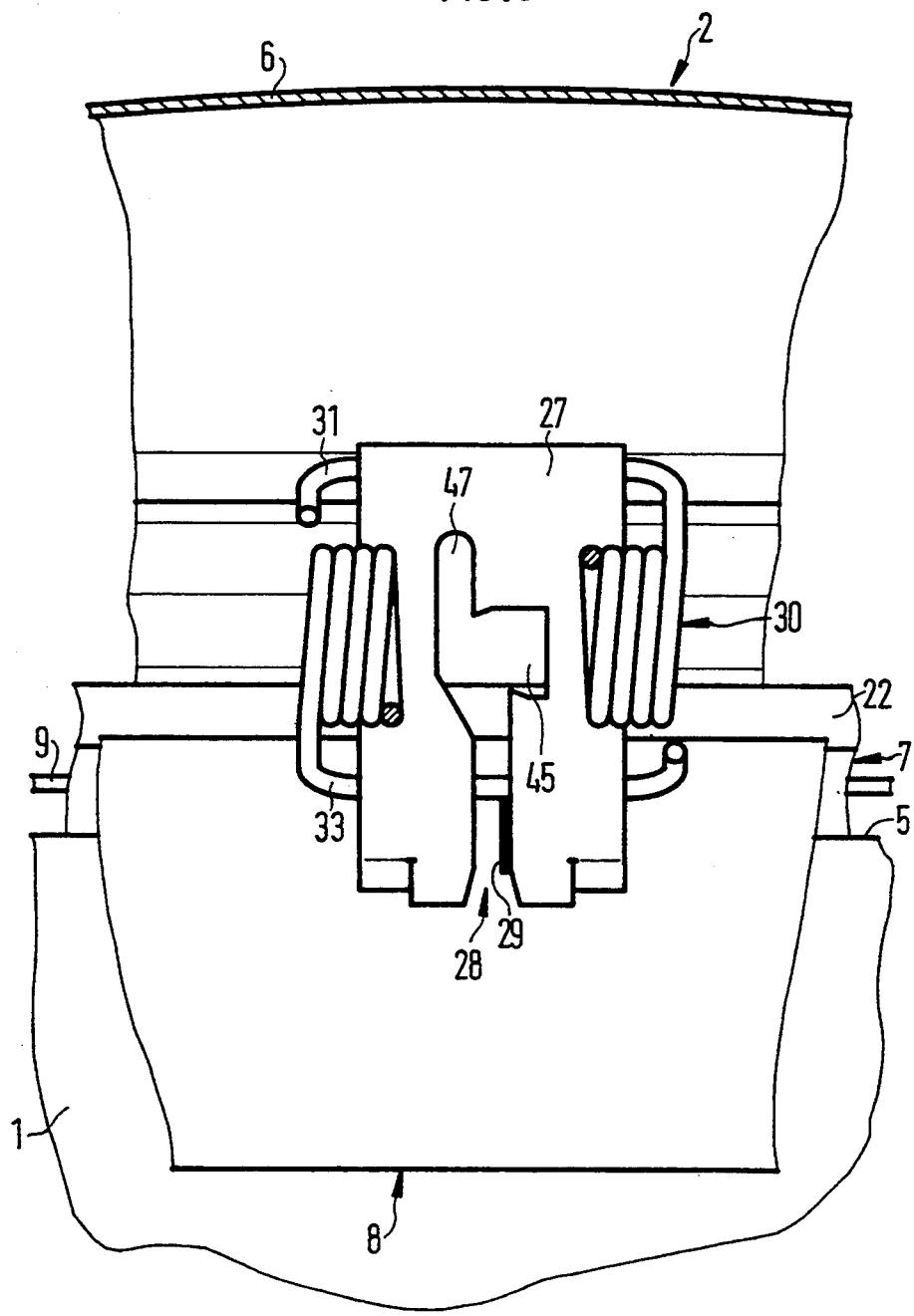
FIG. 6 A part sectional view corresponding to line VI—VI of FIGS. 2 and 3 with the represented elements in the closed position.

As can be gathered from FIGS. 5 and 6, for example, uniformly circumferentially distributed links 27 firmly connected to the dome 6 are internally fitted in the latter and their lower ends extend into the centering ring 8. In each case the links 27 have a downwardly open link slot 28, in which is guided a nose 29 fixed internally on the centering ring 8. Obviously the number and circumferential distribution of the noses 29 on the centering ring 8 correspond to the number and circumferential distribution of the links 27 on the dome 6. A spring 30 is associated with each link and nose pair 27, 29. The spring 30 is constructed as a helical torsion spring and whose ends are bent round in opposite directions roughly parallel to one another and to the spring axis. The upper spring end 31 engages on an abutment 32 located at the top on the link 27, whereas the lower spring end 33 is supported on the nose 29. The springs 30 are fitted with a pretension having a tendency to displace the dome 6 and the centering ring 8 (with the sealing ring 7 and the thrust ring 9 fitted thereon) axially relative to one another in opposite directions. Because of the spring pretension, the dome 6, and therefore the clips 10, are urged upwardly when the cooker is closed, thereby causing the lower legs 34 of the clips 10 to press from below onto the pouring edge 5. At the same time, the springs 30 urge the centering ring 8, and with it the integrally connected sealing ring 7 and thrust ring 9, downwardly so that the sealing surface 26 of the sealing ring 7 is pressed against the pouring edge 5. If the dome 6 and the centering ring 8 with the parts fitted thereto are separated from one another, the springs 30 remain on the dome 6, the lower spring ends 33 being in each case supported on a lateral projection 35 (e.g. FIG. 12). The springs 30 have a smaller pretension, so that they can be easily removed and fitted.

Figure 3:
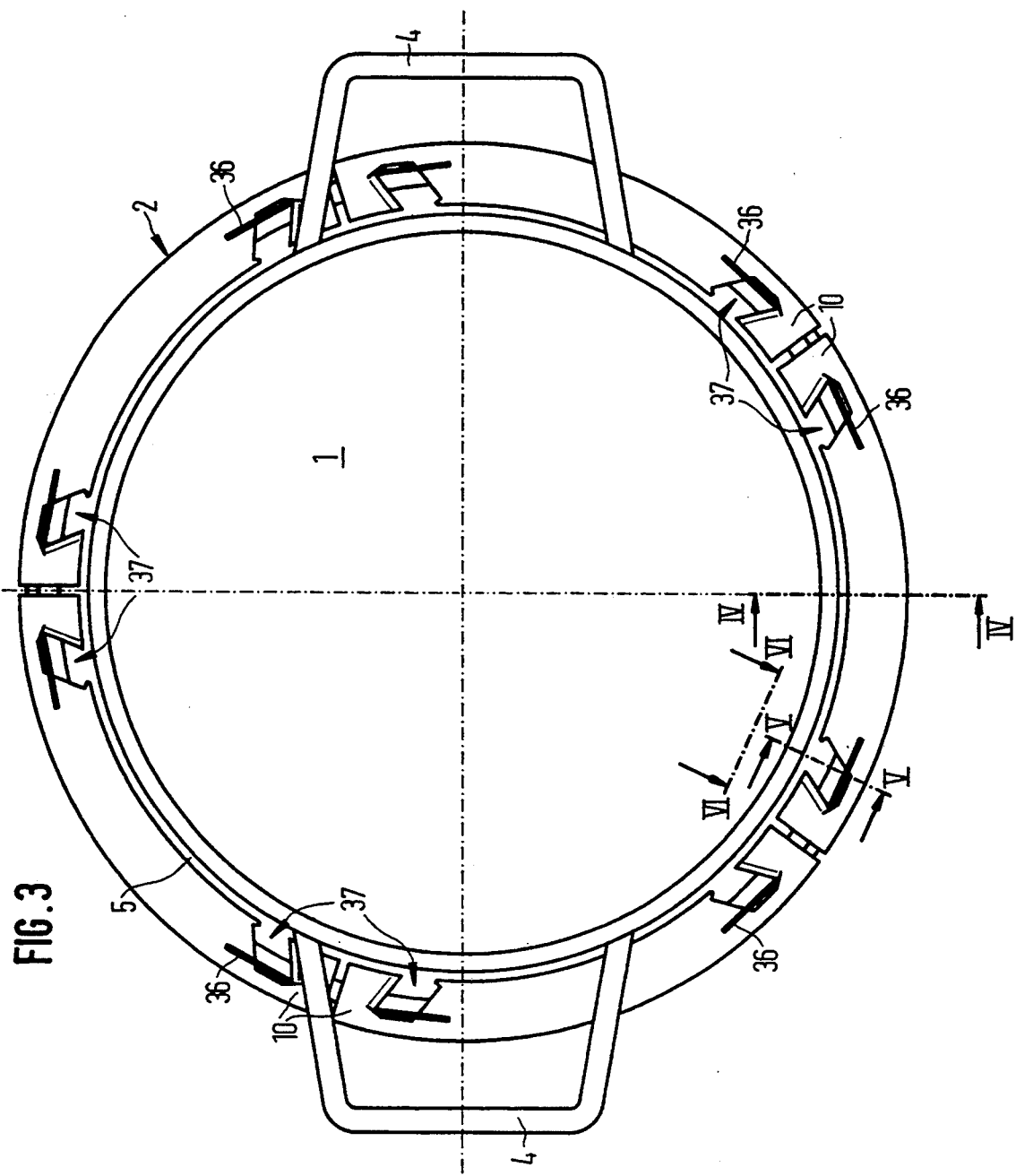
FIG. 3 A view from below of the pressure cooker according to FIG. 1.
Figure 7:
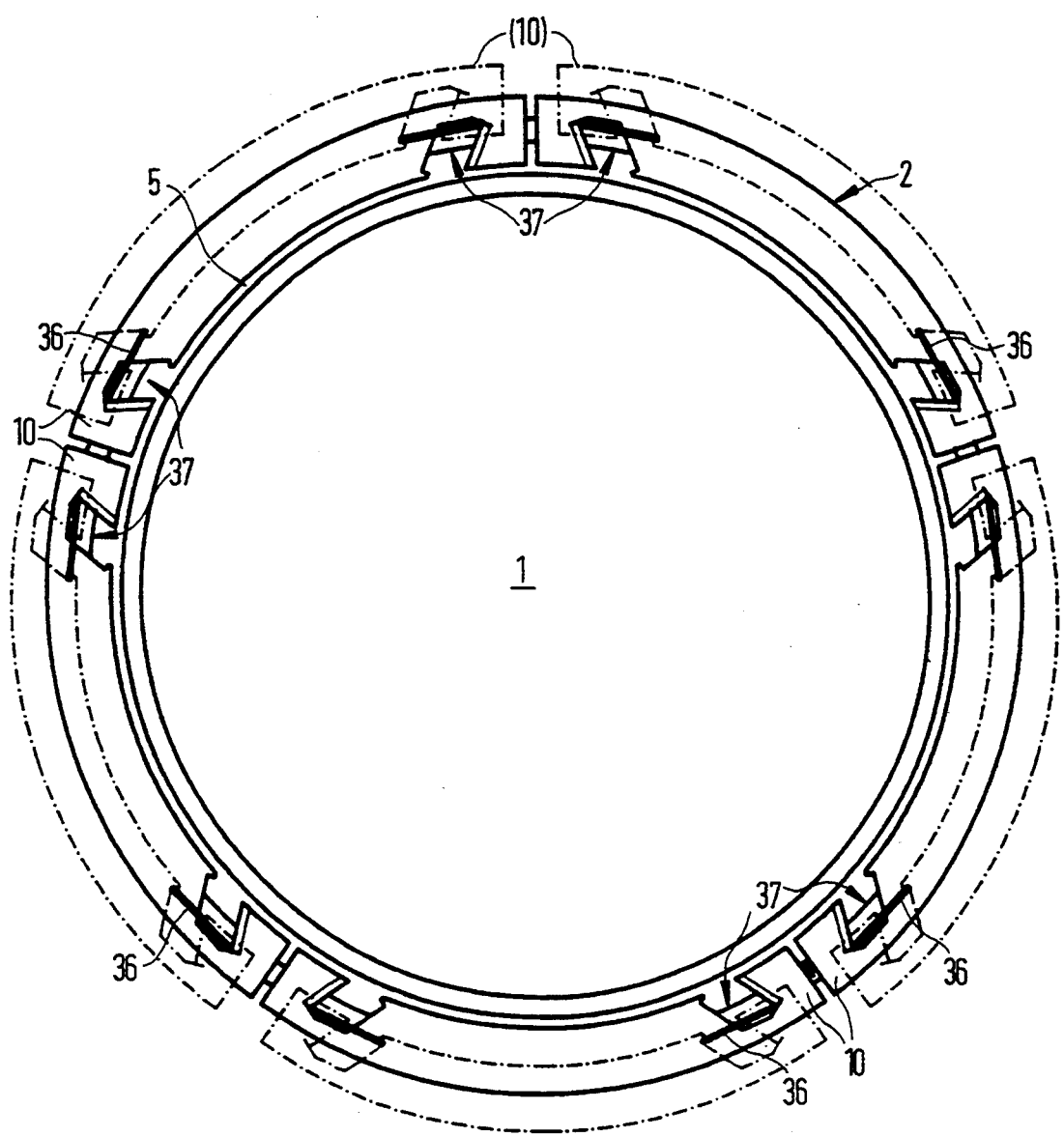
FIG. 7 A view from below of the pressure cooker (without side handles) with clips shown by continuous lines in the closed position and dot-dash lines in the open position.
Figure 12:
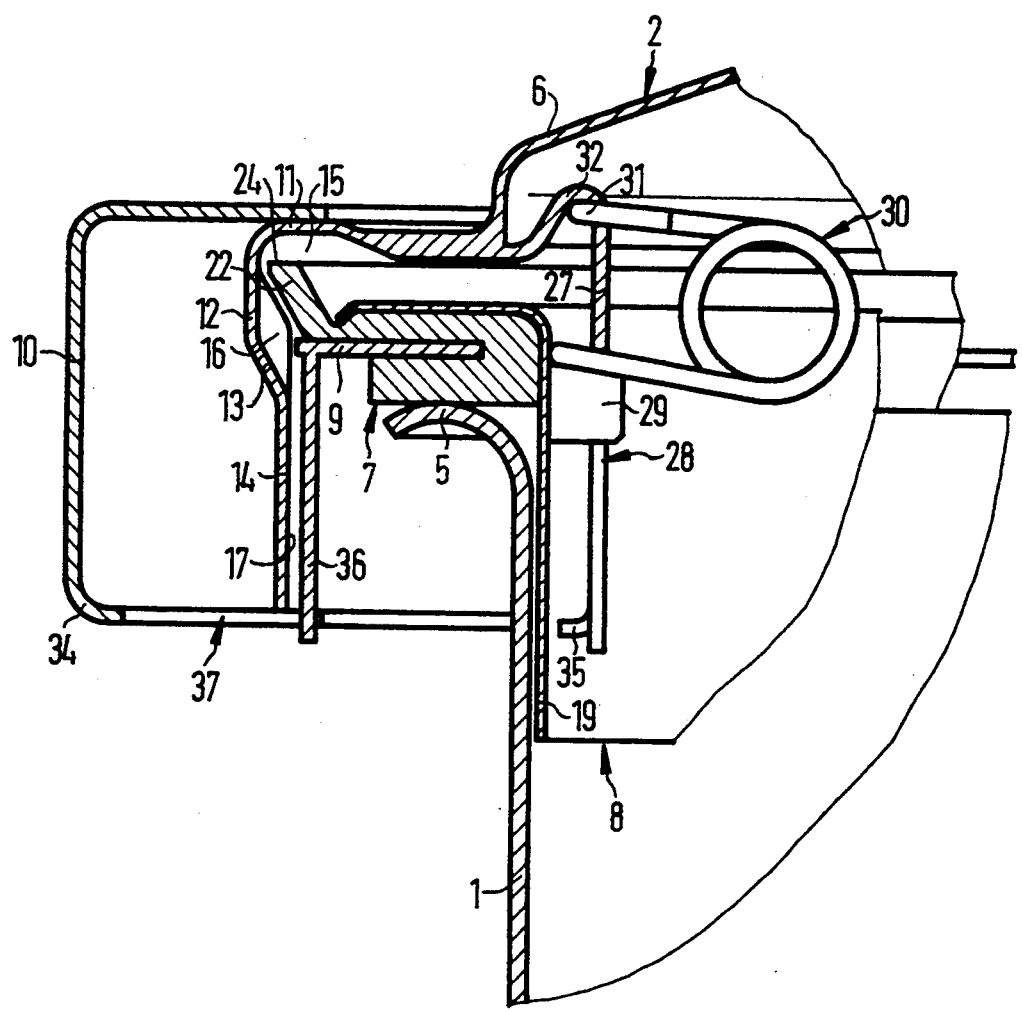
FIG. 12 A sectional view similar to FIG. 5, but with the elements in the open position in which the lid can be raised from the cooker bowl.
Figure 13:
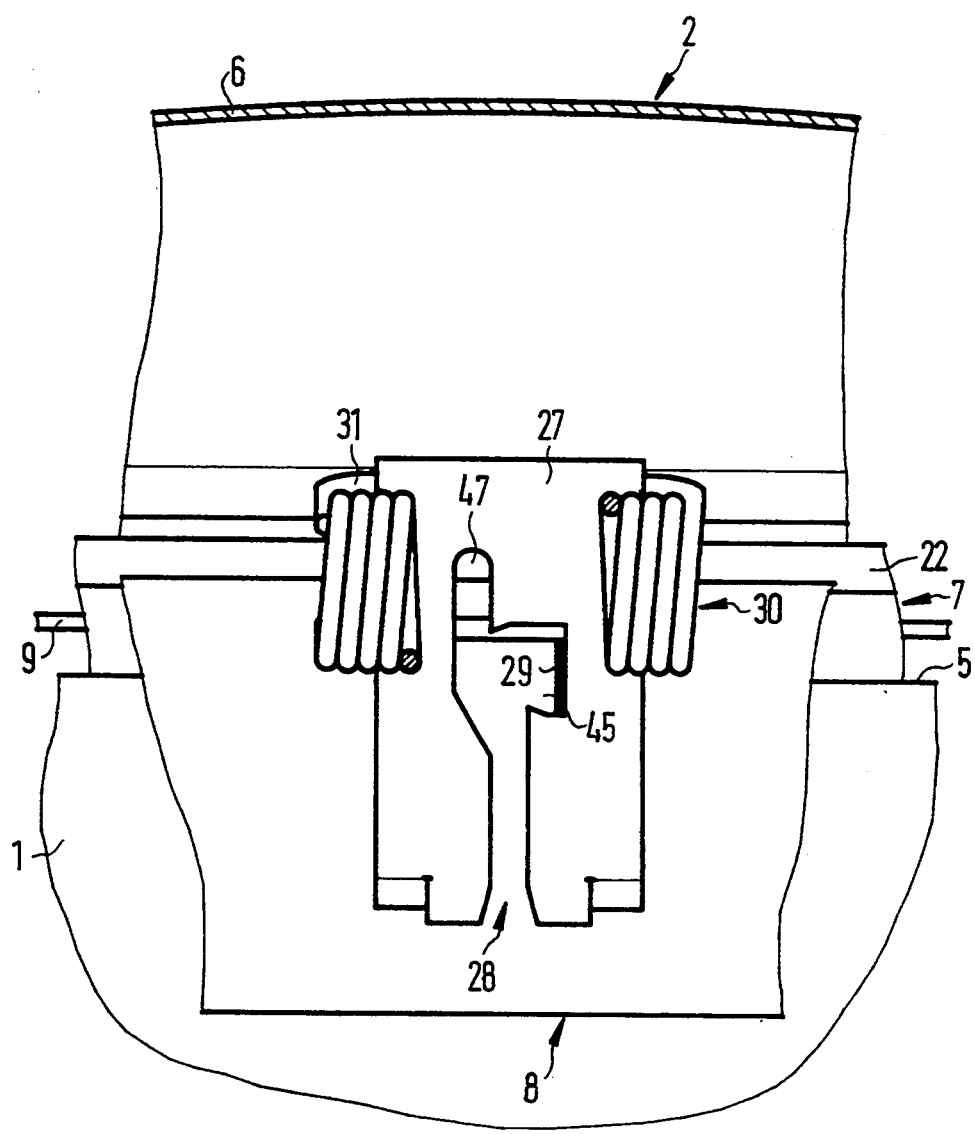
FIG. 13 A sectional view similar to FIG. 6, but in the open position according to FIG. 12.

Downwardly directed tongues 36 project over the clips 10 and are firmly connected to the thrust ring 9. The tongues 36 are arranged tangentially between the pouring edge 5 and the cylindrical inner surface 17 of the dome 6 (FIG. 5). In conjunction with guide slots 37, which are provided in the lower leg 34 of the clips 10 and which are traversed by the tongues, said tongues 36 control the radially directed opening and closing movements of the clips 10. There are two tongue and guide slot pairs 36, 37 for each clip 10, as shown in FIGS. 1, 3 and 7. The tongue and guide slot pairs 36, 37 are homologously arranged with respect to radial axes of symmetry of the clips 10.

To illustrate the special shaping of the tongues 36 and the guide slots 37 reference should be made to FIGS. 8 and 9. The tongues 36 are flat plates provided tangentially on the outer circumference of the thrust ring 9, and in the section according to FIG. 5 are connected perpendicularly to the thrust ring 9. However, in the viewing direction according to FIG. 9 the tongues 36 have an angular configuration, with a shorter leg 38 connected perpendicularly to the thrust ring 9 and a longer leg 39 at an angle of 45° to the leg 38 in the represented embodiment. The lateral edges of the legs 38, 39 connect to one another with arcuate transitions and form guide edges 40 and 41. The guide edges 40 and 41 coincide in a parallel manner, so that the transverse size of the tongues 36, i.e. the dimensions between the guide edges 40, 41 parallel to the thrust ring 9 are the sane at all points. The longer legs 39 of in each case two tongues 36 cooperating with a clip 10 are arranged in downwardly converging manner (FIG. 1).

The associated guide slots 37 in the lower leg 34 of each clip 10 are in the form of recesses with two parallel guide edges 42, 43, which are inclined with respect to an imaginary radial axis at the point of the slot 37. The reciprocal spacing of the guide edges 42, 43 is matched to the aforementioned transverse size of the tongues 36, as illustrated in FIG. 9. The tongues 36 and guide slots 37 in each case cooperate with the guide edge pairs 40, 42 and 41, 43, the guide edge pair 40, 42 sliding on one another during radial displacement of the clip 10 into the closed position and the guide edge pair 41, 43 slides on one another during the radial displacement of the clip 10 into the open position. The two guide slots 37 on each clip 10 are so oriented with respect to their inclined position, that they converge towards one another in the direction of the curvature center of the clip 10 (FIGS. 3 and 7).

As a result of a wedging action on inserting the tongues 36 in the guide slots 37, there is a radial inward movement of the clips 10 into the closed position (FIG. 3), whereas on disengaging the sane there is an outward movement into the open position (dot-dash lines in FIG. 7). This interaction can best be seen in FIG. 7. FIGS. 8 and 9 show the relative position of the tongues 36 and the slots 37 in the closed position, while FIGS. 10 and 11 show the tongues 36 and the slots 37 in the end position corresponding to the open position. At the end of the movement into the open position, a stop 44 inwardly bounding the guide edge 43 strikes against the tongue 36, as shown in FIG. 10.

The movement control of the clips 10 from the closed position and into the open position and vice versa can take place in different ways, without there having to be any fundamental modification to the above-described construction. However, the above-described arrangement is particularly advantageous.

Hereinafter the operation of the above-described steam pressure cooker will be explained. In order to open the steam pressure cooker the grip 3 and therefore the dome 6 must be pressed downwards. This is only possible if an overpressure possibly present in the cooker has almost completely been removed beforehand. This is illustrated by the following example. In the case of an internal diameter of the cooker 1 of 22 cm, the cylindrical inner surface 17 of the dome 2 has a diameter of approximately 25 cm. With an operating pressure of 0.8 bar, a force of 4000N acts against the actuating direction necessary for opening purposes. Assuming that the total tension or pressure of the springs 30 is approximately 30N, it results that the internal pressure must be reduced to less than 0.015 bar, so that the lid 2 can be opened with a reasonable force of 100N.

If during the opening process the grip 3 and with it the dome 6, the links 27 and the clips 10 starting from the closed position according to FIGS. 5 and 6 are pressed downwards, the relative position of the cooker 1 and the lid 2 change in that the cooker 1 and with it the pouring edge 5, the centering ring 8 with the noses 29, the sealing ring 7 and the thrust ring 9 appear inserted in the dome 6. As soon as the sealing edge 25 leaves the cylindrical inner surface 17, it encounters the webs 16, so that at least in the vicinity of said webs it is prevented, as a result of the rubber elastic behaviour of the sealing lip 22, from tightly engaging on the inner wall surfaces of the transition portion 13 and the wall portion 12. Thus, the sealing action of the sealing lip 22 is cancelled out and any residual pressure present in the steam pressure cooker is completely removed.

During this initial downward displacement of the lid 2 relative to the cooker 1, the tongues 36 are moved into the guide slots 37 only in the vicinity of the shorter leg 38, so that there is as yet no significant radial outward displacement of the clips 10. Only when the sealing action of the sealing lip 22 has been removed does a further disengagement of the tongues 36 from the guide slots 37 as a result of the engagement of the longer leg 39 of the tongues 36 with the guide slots 37, bring about an increasing radial outward displacement of the clips 10 into the open position according to FIG. 12. This ensures that the clips 10 only start to free the pouring edge 5 of the cooker 1 when there is no further overpressure in the steam pressure cooker.

Starting from the position shown in FIG. 6, the noses 29 slide into the link slots 28 during the opening process. As soon as they reach the position corresponding to the open position of FIG. 13, assisted by the transverse tension of the springs 30, they latch into locking recesses 45 of the link slots 28. The lid 2 is now fixed in the open position (FIGS. 12 and 13) and can be raised from the cooker 1.

To close the steam pressure cooker, the lid 2 initially is engaged on the cooker 1, and the centering ring 8 ensures that the correct position is found. The grip 3 and therefore the links 27 are turned slightly with respect to the centering ring 8 and the noses 29 counter to the transverse tension of the springs 30, so that the noses 29 are disengaged from the locking recesses 45. As a result of the tension of the springs 30, without any further action on the part of the user, the lid 2 snaps into the closed position according to FIGS. 5 and 6.

As a result of the described construction of the tongues 36 the clips 10 are initially radially inwardly displaced into the closed position, before the sealing edge 24 of the sealing lip 22 again acquires its sealing action on the cylindrical inner surface 17 of the dome 6. This ensures that an over-pressure can only build up in the steam pressure cooker when the clips 10 completely engage round the dome 6 and the pouring edge 5 and the cocker is in the defined closed position (FIGS. 5 and 6).

Figure 14:
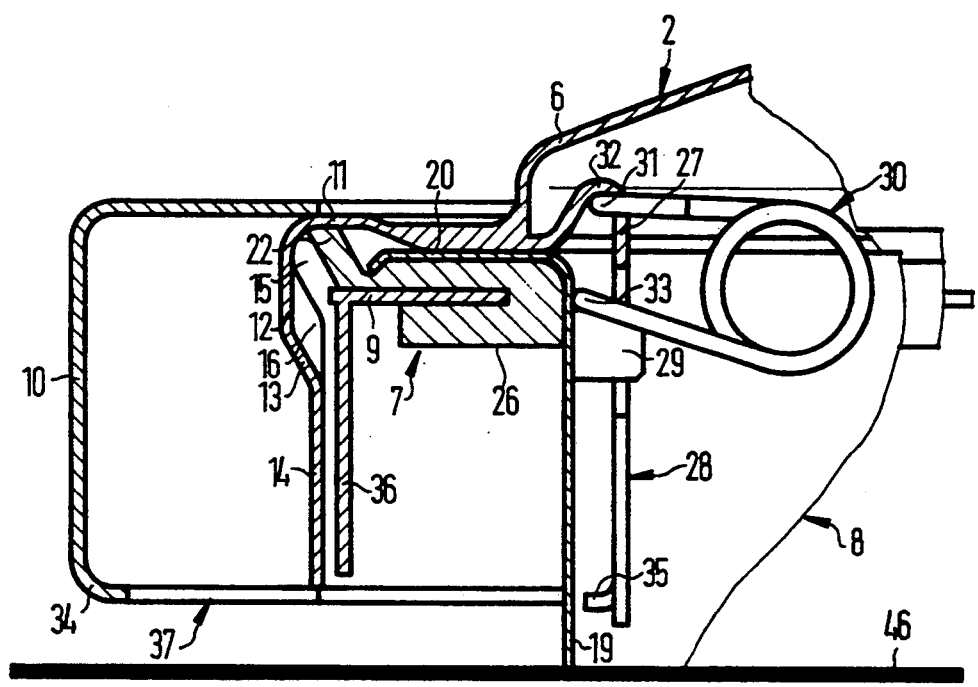
FIG. 14 A sectional view similar to FIGS. 5 and 12, but only showing the lid in a position for the disassembly thereof.

In order to illustrate the disassembly or dismantling of the lid 2 reference is now made to FIGS. 14 to 17. For disassembly purposes the lid 2 is placed with the lower edge of the centering ring 8 on a firm, planar surface 46 (cf. FIGS. 14 and 15). The parts of the lid assume the position shown in FIGS. 12 and 13. Accompanied by simultaneous rotation, the grip 3 is forced downwards counter to the transverse tension of the springs 30, so that the noses 29 are disengaged from the locking recesses 45 and slide upwards into the link slot 28, where they enter end recesses 47 thereof. Before reaching an end stop the sealing lip 22 comes into contact with the planar inner surface of the supporting edge 11 (FIG. 14). If it is now wished to force further downwards the grip 3 and the dome 6, the sealing lip 22 must be elastically deformed over its entire circumference, for which purpose a considerably increased force must be applied. This ensures that the grip 3 and the dome 6 are not unintentionally pressed until stop abutment occurs in the disassembly position.

In the disassembly position the tongues 36 are completely withdrawn from the guide slots 37, as shown in FIGS. 16 and 17. The clips 10 can now be drawn cut radially while the grip 3 and the dome 6 remain pressed downwards. The centering ring 8, the sealing ring 7 and the thrust ring 9 ejected by the springs 30 can be removed at the bottom. The sealing ring 7 can be disengaged from the thrust ring 9. The now relieved springs 30 can, if desired, be removed. Appropriately assembly of the lid 2 takes place in the reverse order.

For illustrating the other embodiment of the interengaging elements of the centering ring 8 and the dome 2 reference will now be made to FIGS. 18 to 23, identical or corresponding parts being given the same reference numerals as hereinbefore, optionally followed by an apostrophe.

Figure 19:
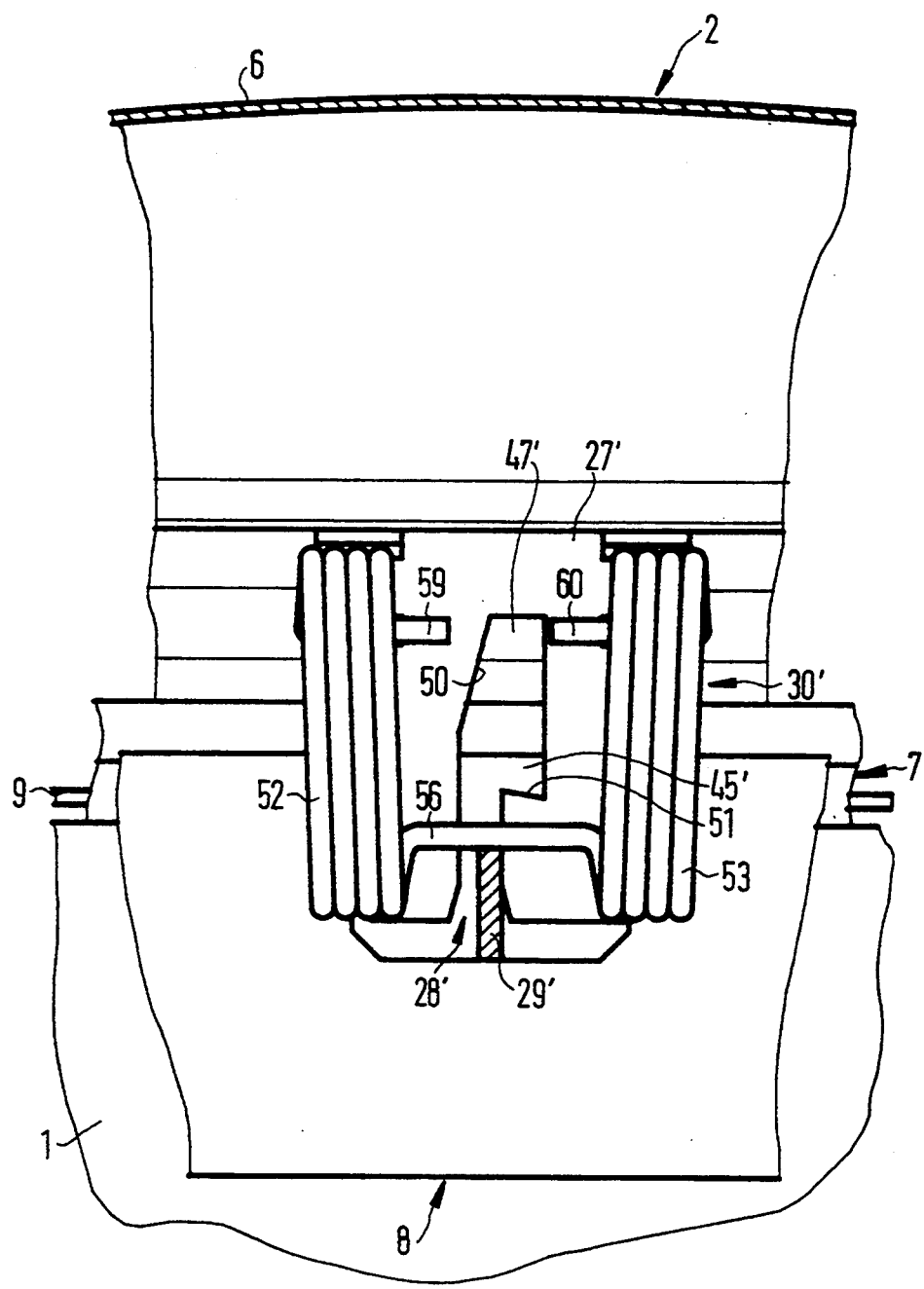
FIG. 19 A sectional view similar to FIG. 6 showing the second embodiment of FIG. 18 in the closed position.
Figure 20:
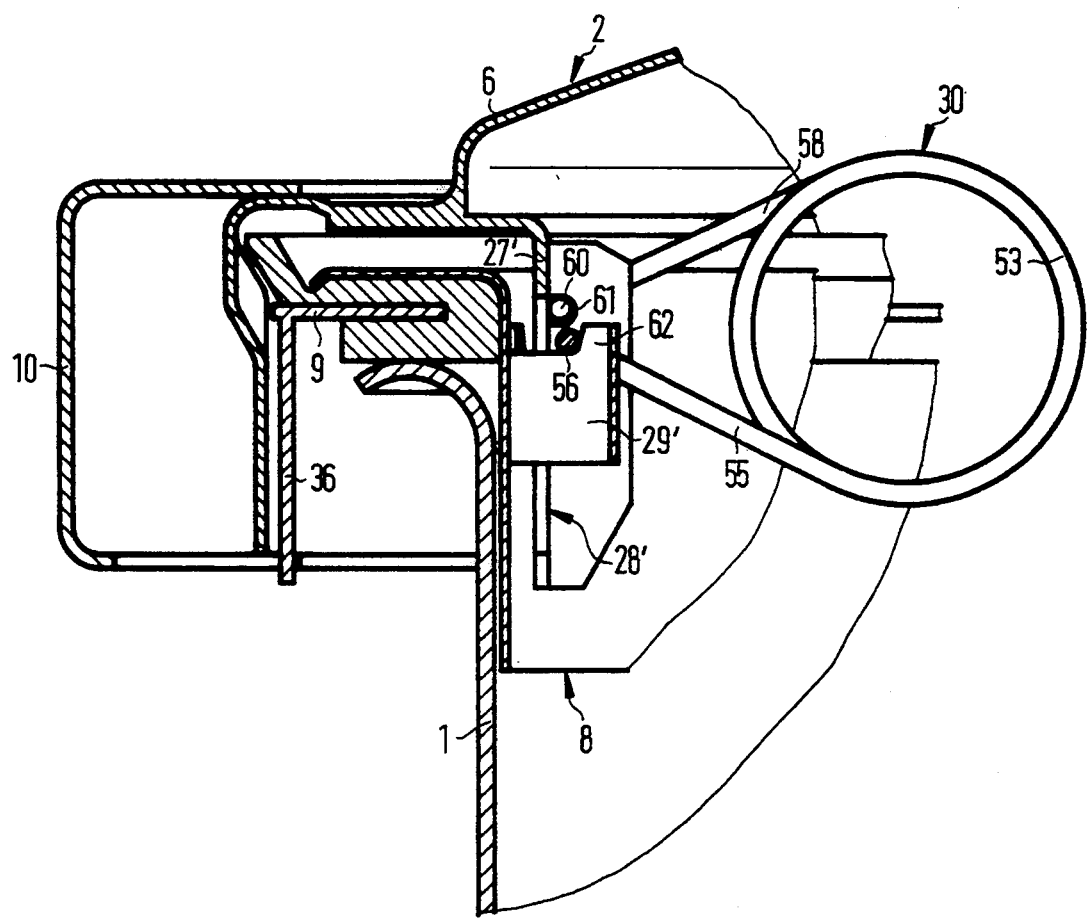
FIG. 20 A sectional view similar to FIG. 18 of the second embodiment, but with the elements shown in the open position.
Figure 21:
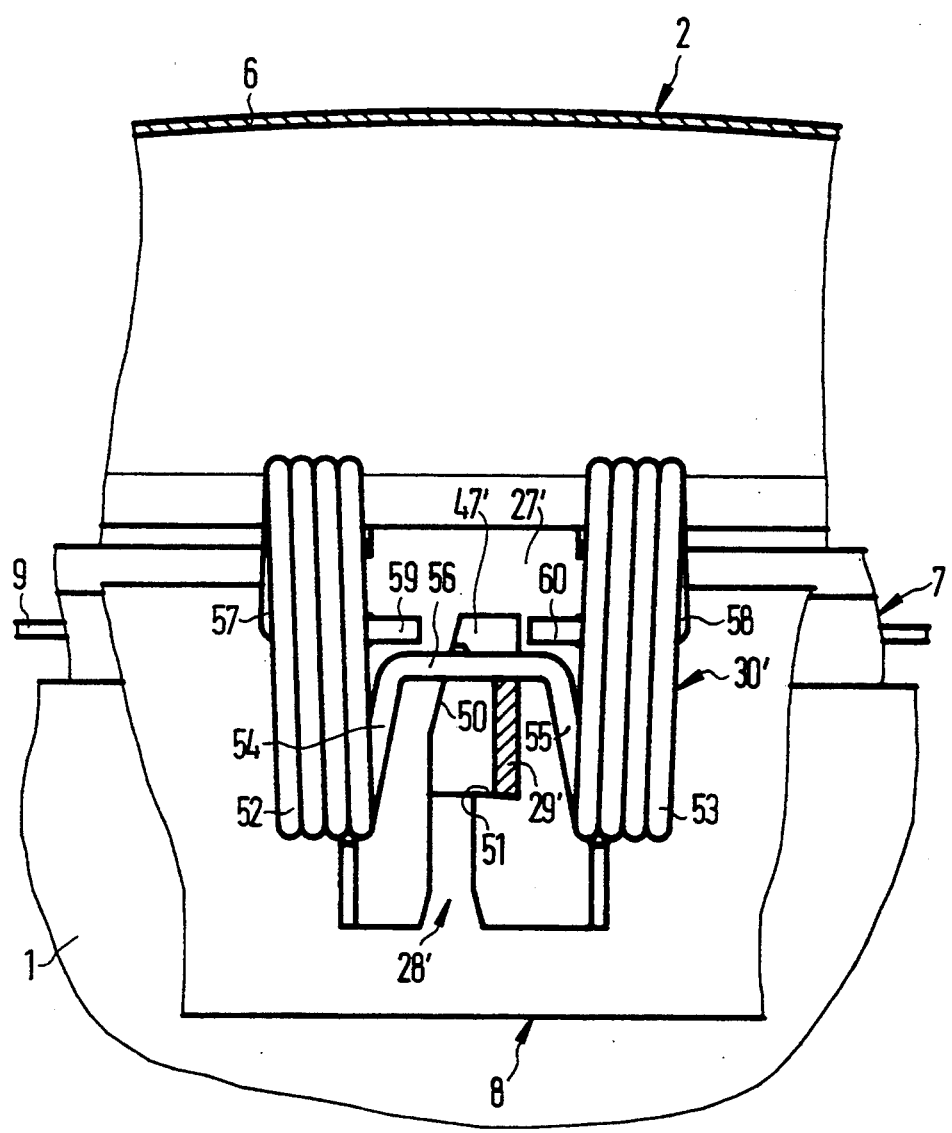
FIG. 21 A sectional view of the second embodiment similar to FIG. 19, but in the open position according to FIG. 20.
Figure 23:
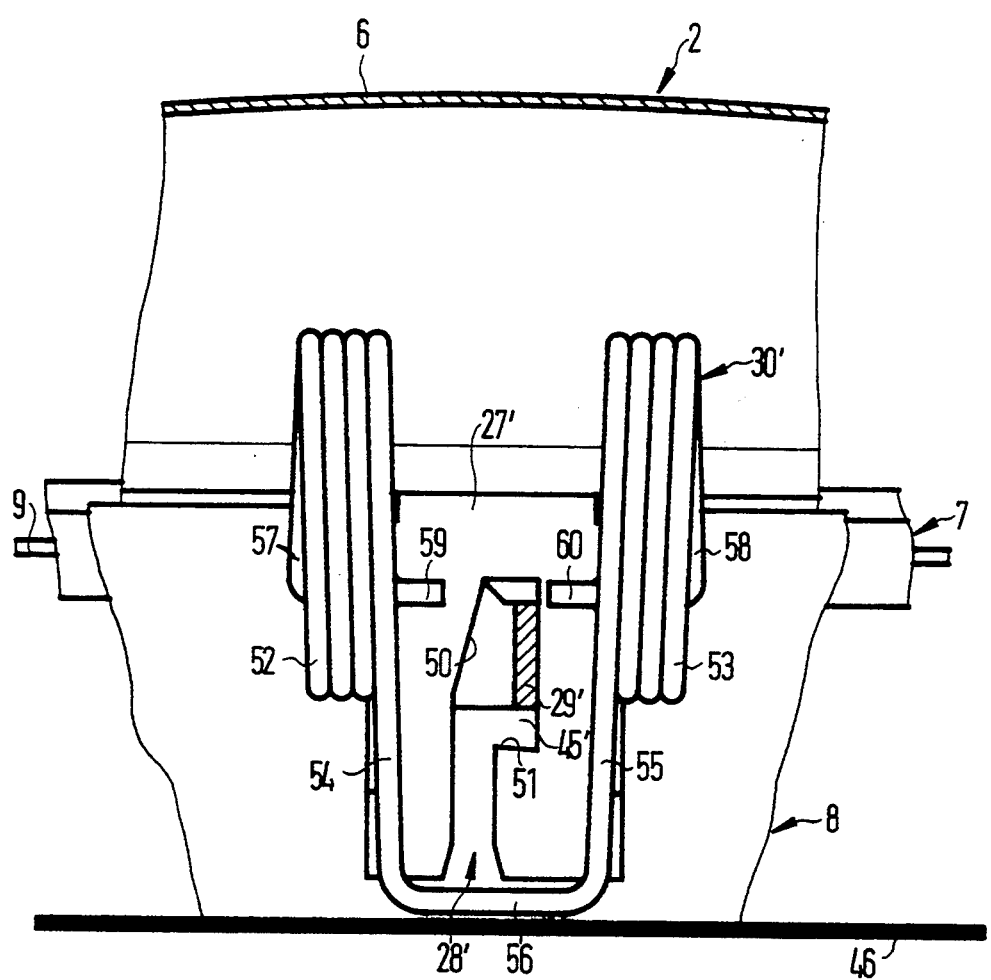
FIG. 23 A sectional view of the second embodiment similar to FIGS. 19 and 21 but only showing the lid in the lid disassembly position of FIG. 22.

As can be gathered from FIGS. 19, 21 and 23, the link slot 28' has an inclined wall portion 50 facing the locking recess 45'. During the downwardly directed opening displacement of the dome 6 from the closed position according to FIGS. 18 and 19, said wall portion 50 encounters the nose 29', so that between the dome 6 and the centering ring 8 there is a limited rotation during the continued downward movement of the dome until, according to FIGS. 20 and 21, the nose 29' is locked in the locking recess 45'. A sloping surface 51 (FIG. 19) downwardly bounding the locking recess 45' facilitates the locking process, much as in the previously described embodiment.

Figure 22:
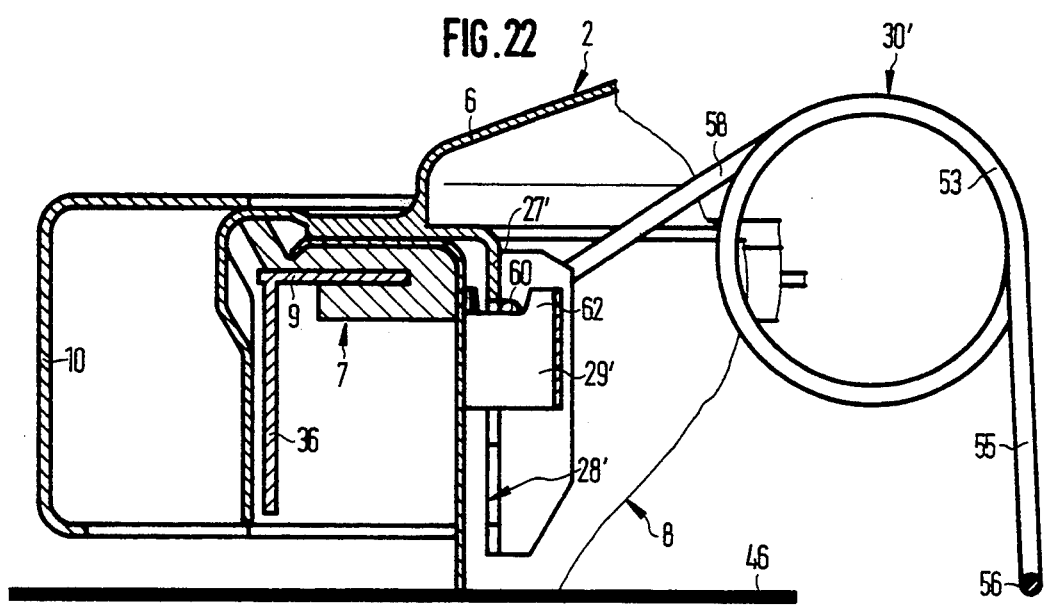
FIG. 22 A sectional view of the second embodiment similar to FIGS. 18 and 20, but only showing the lid in accordance with FIG. 14 in a lid disassembly position.

In this embodiment the modified springs 30' shown in FIGS. 18 to 23 can be used. The springs 30' are formed from two spaced, equiaxially juxtaposed helical torsion springs 52, 53, which have an opposite thread direction. Their inner, facing spring legs 54 and 55 (FIG. 21) are connected by a wire bridge 56 running parallel to the axis of the springs 52, 53 so as to form a one-piece spring 30'. The spring 30' is supported with pretension on the one hand by means of the wire bridge 56 on the nose 29' and on the other by means of its outer spring leg 57, 58 at facing points on the link 27'. For this purpose the ends 59 or 60 of the spring legs 57, 58 are bent over towards one another and hung in bearing bores 61 of the link 27'. Thus, with the lid disassembled, the springs 30' remain on the dome 6, whereas the wire bridge 56 can easily be disengaged from the centering ring 8 by means of an upwardly directed projection 62 of the nose 29' (FIGS. 22 and 23). Thus, the projection 62 ensures the engagement of the springs 30' on the noses 29' both in the closed position (FIGS. 18 and 19) and in the open position (FIGS. 20 and 21).

As can be gathered from FIGS. 18 and 20, considered in the axial direction of the helical torsion springs 52, 53, the inner spring legs 54, 55 and the outer spring legs 57, 58 converge towards one another in the direction of the associated link 27' starting from the spring circumference and namely over the entire movement range from the closed position (FIG. 18) to the locked open position (FIG. 20). This leads to a particularly appropriate spring characteristic for the operation of the steam pressure cooker. The latter is opened and closed and the lid assembled and disassembled in the manner described hereinbefore.

In order to illustrate the further embodiment of the steam pressure cooker reference will now be made to FIGS. 24 to 38, in which identical or corresponding parts are given the same reference numerals, optionally supplemented by one, two or three apostrophes. The further embodiment differs from that described hereinbefore through an advantageous displacement of the elements locking the open position from the interior of the lid to the exterior of the lid and by a simplified construction and arrangement of the springs acting on the dome and centering ring in the sealing direction.

Figure 24:
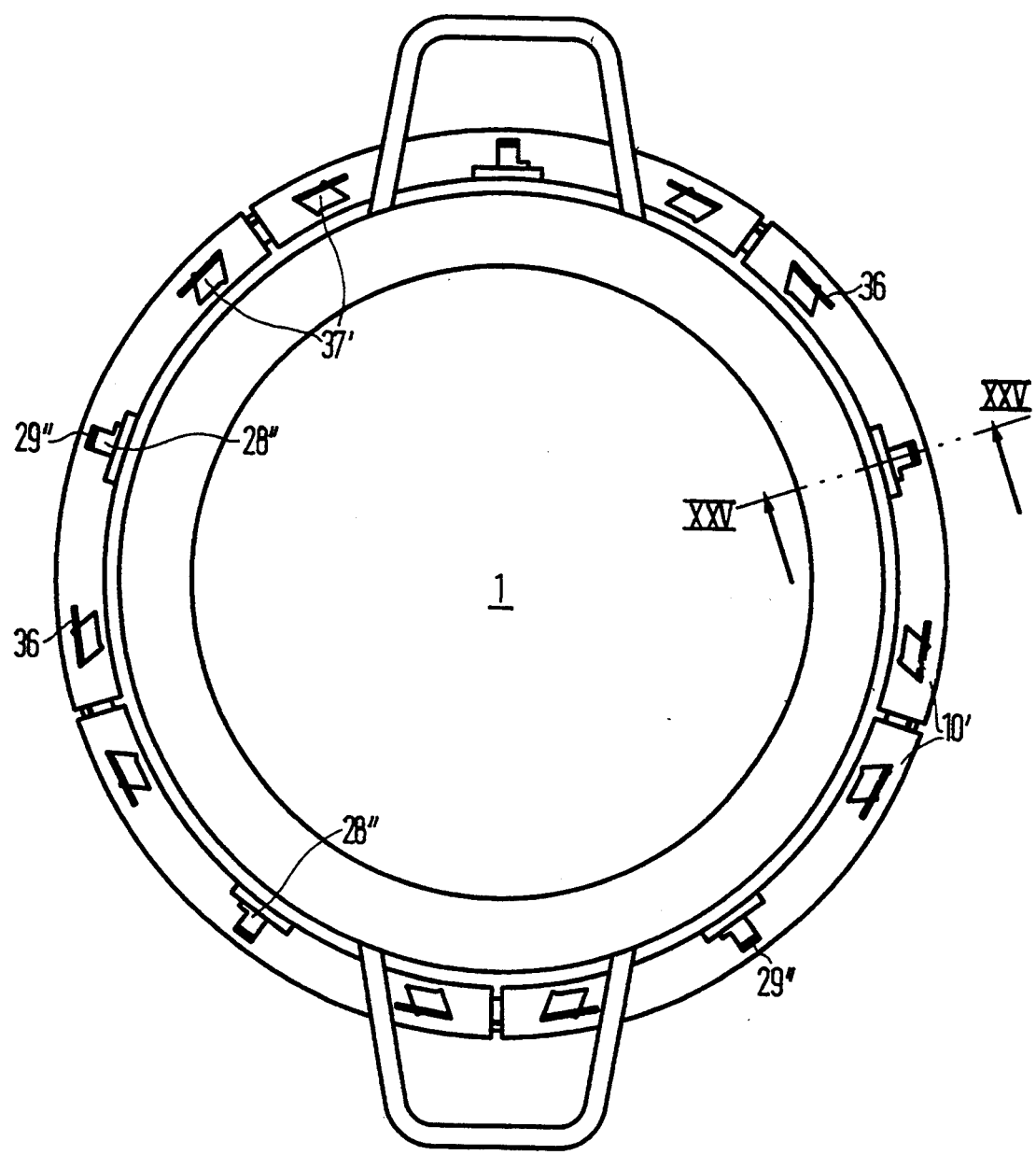
FIG. 24 A view from below of a third embodiment of a pressure cooker according to the invention in the closed position.
Figure 25:
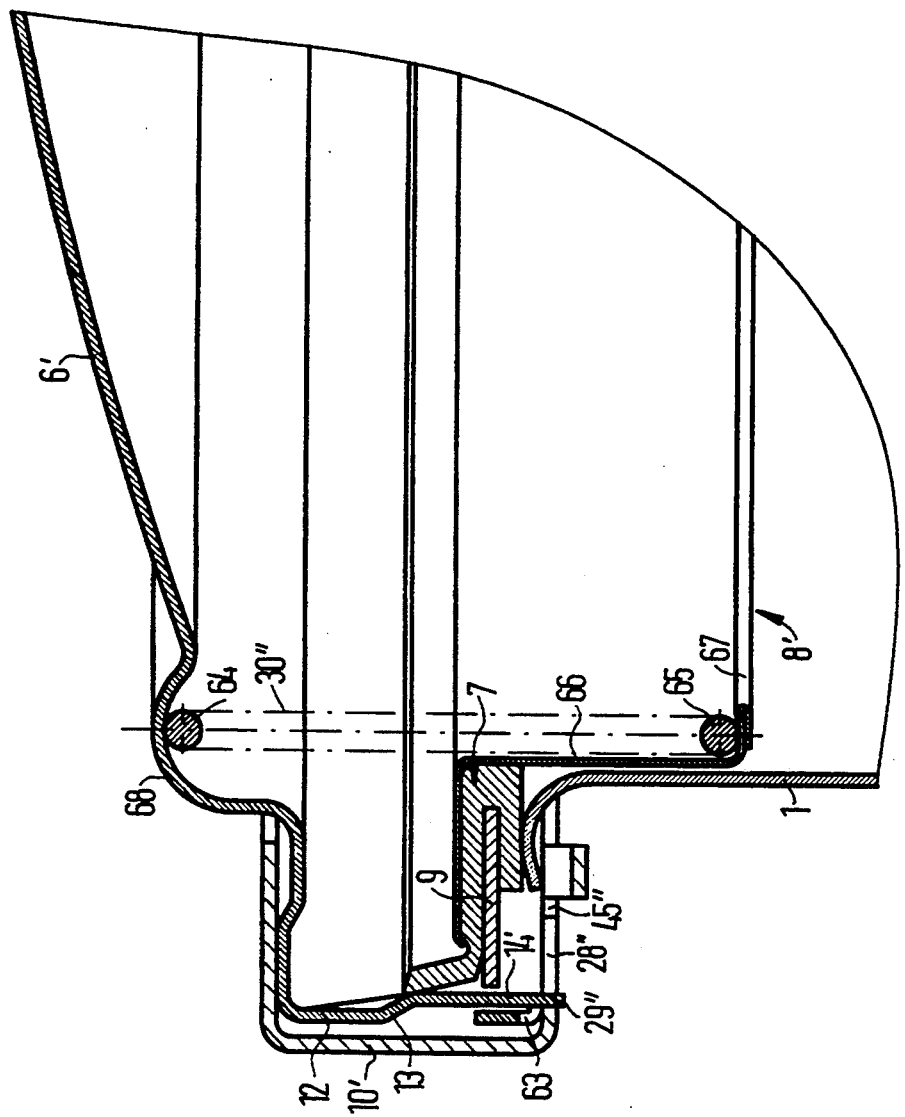
FIG. 25 A part sectional view corresponding to line XXV—XXV of FIG. 24.
Figure 26:
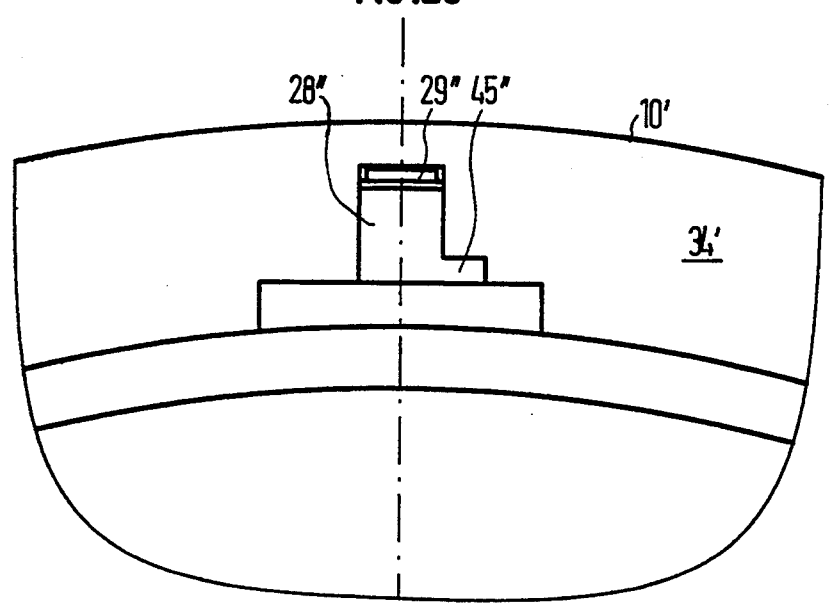
FIG. 26 A partial view from below of a clip according to the third embodiment in the closed position.
Figure 27:
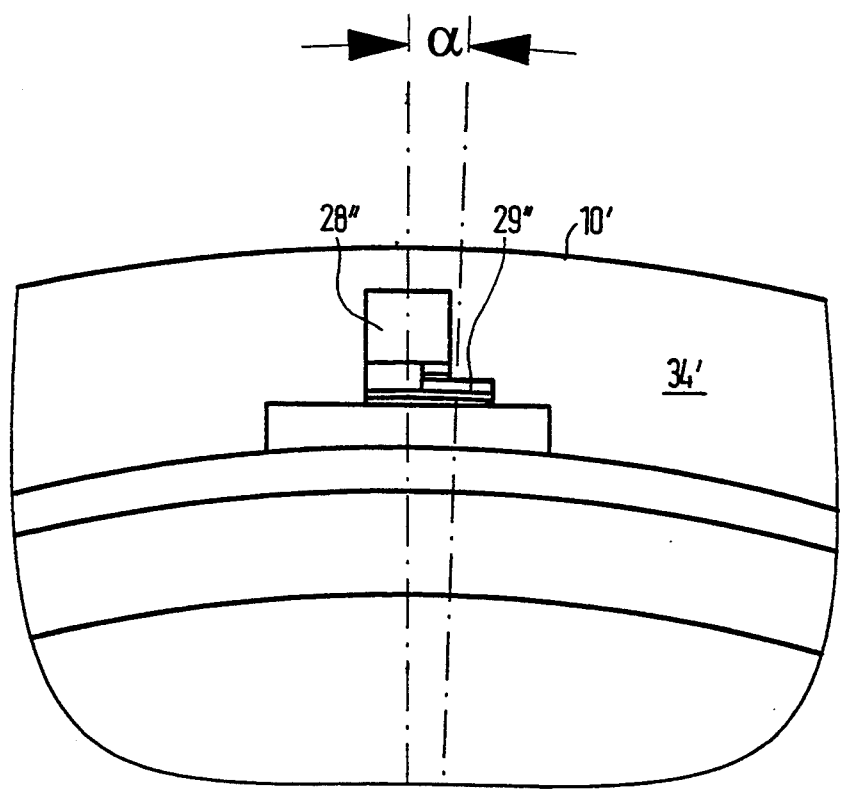
FIG. 27 A partial view from below of the clip of FIG. 26 in the open position.
Figure 28:
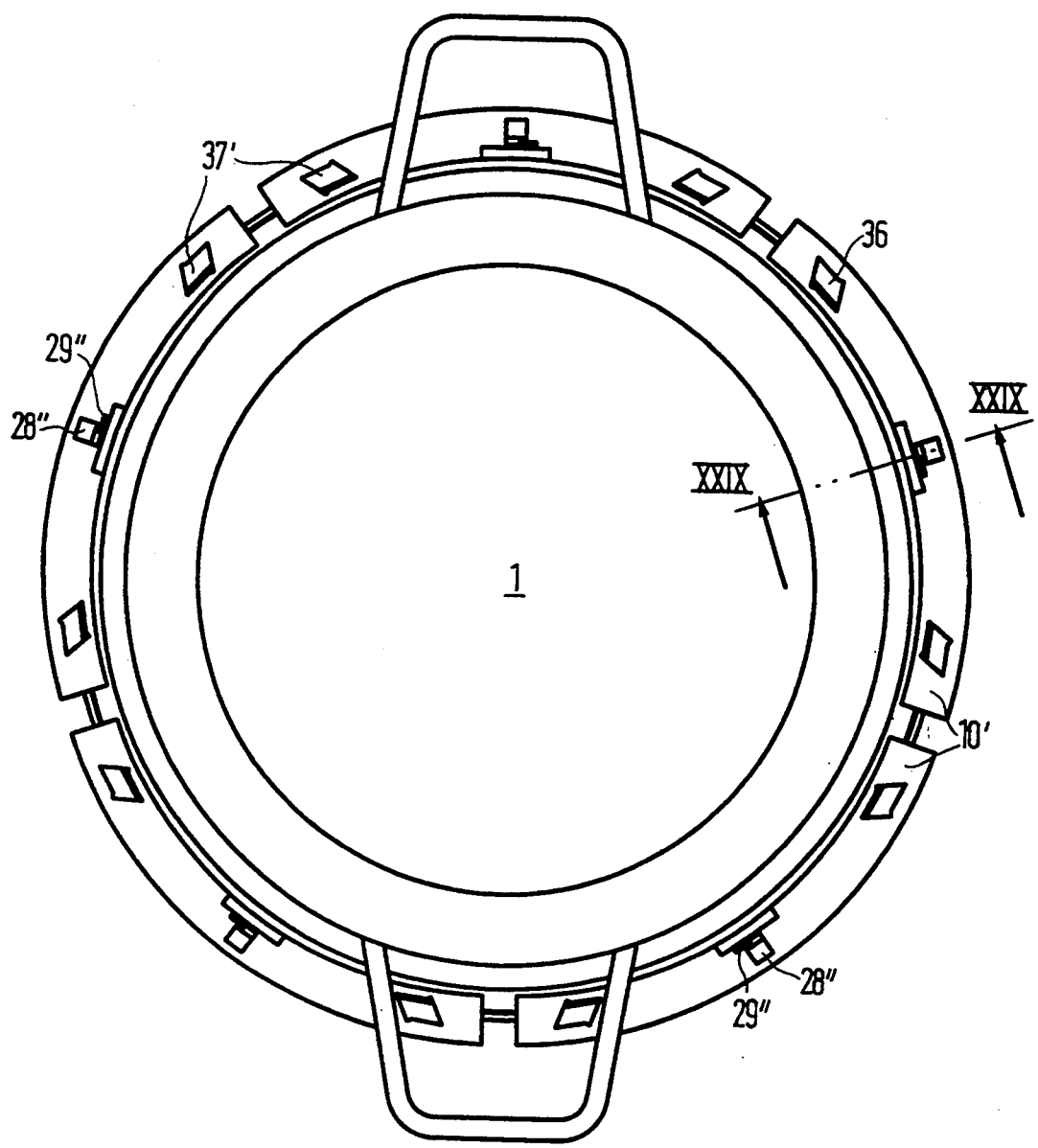
FIG. 28 The view from below of the pressure cooker according to the third embodiment in the open position.

As can e.g. be gathered from FIGS. 24 and 25, uniformly circumferentially distributed, downwardly directed noses 29" are provided in the same numbers as the clips 10' on the lower edge 63 of the circumferential wall of the dome 6'. Starting from the position shown in FIG. 26, during the opening process the noses 29" slide into the link slots 28" which are located in the lower leg 34' of the associated clips 10'. More specifically, the slips 10' slide with their link slots 28" on the noses 29" positioned in fixed manner relative thereto. As soon as they reach the position corresponding to the open position according to FIG. 27, by rotating the grip 3 and therefore the dome 6' by the small angle α, they latch in the locking recesses 45" of the link slots 28". The lid is now fixed in the open position (FIGS. 27, 28 and 29).

To close the lid the dome 6' is rotated back by the angle α, the noses 29" being disengaged from the locking recesses 45" everything else happening in the above-described manner.

The spring 30", which brings about the closing process, is shown in the untensioned state in FIGS. 30 and 31. It is constructed as a split or closed ring of spring steel wire and parallel to its center axis has uniformly circumferentially distributed bulges or deformations 64, 65 directed in alternating direction.

Figure 29:
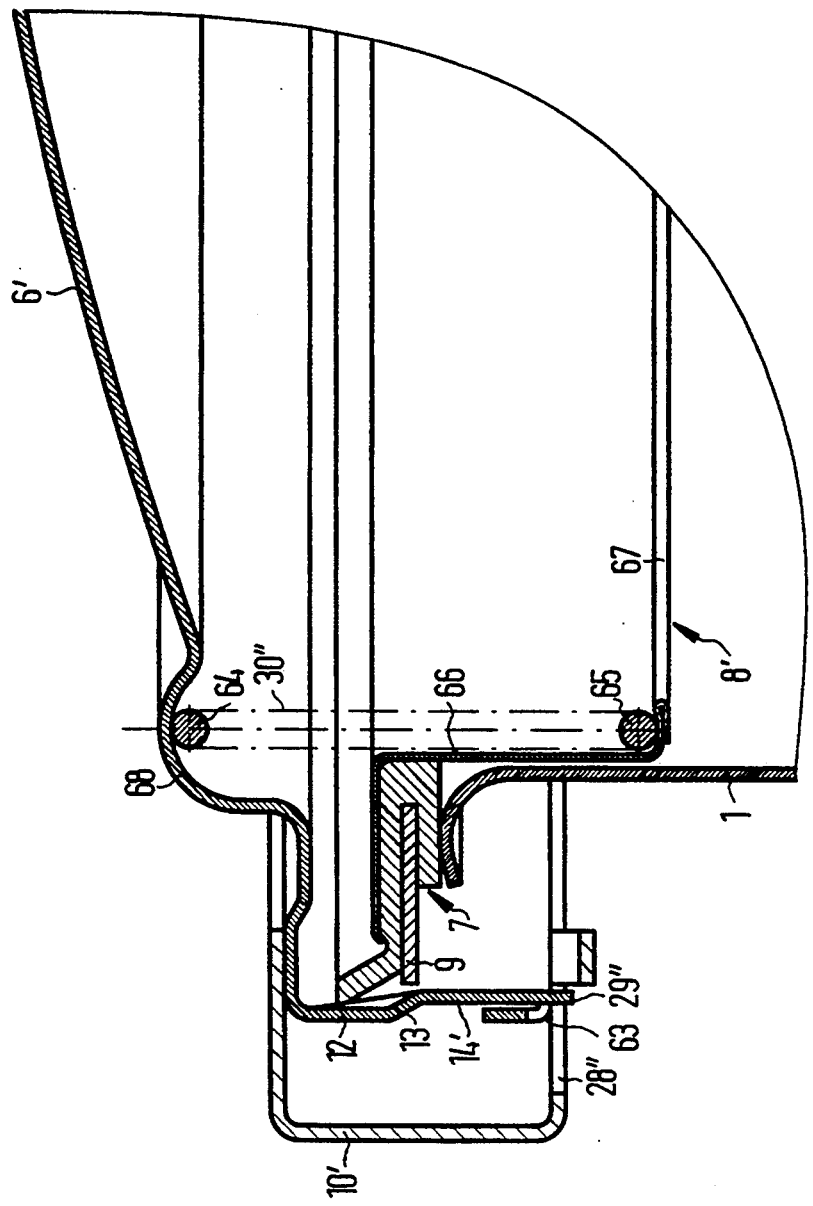
FIG. 29 A part sectional view corresponding to line XXIX—XXIX of FIG. 28.

As can be gathered e.g. from FIG. 29, the spring 32" is positioned coaxially to the cylindrical inner surface 66 of the centering ring 8'. The downwardly pointing bulges 65 engage on an inwardly directed flange 67 of the centering ring 8'. The upwardly directed bulges 64 engage in a channel 68 running round the dome 6'. The flange 67 and channel 68 consequently form the abutment for the spring 30".

Figure 32:
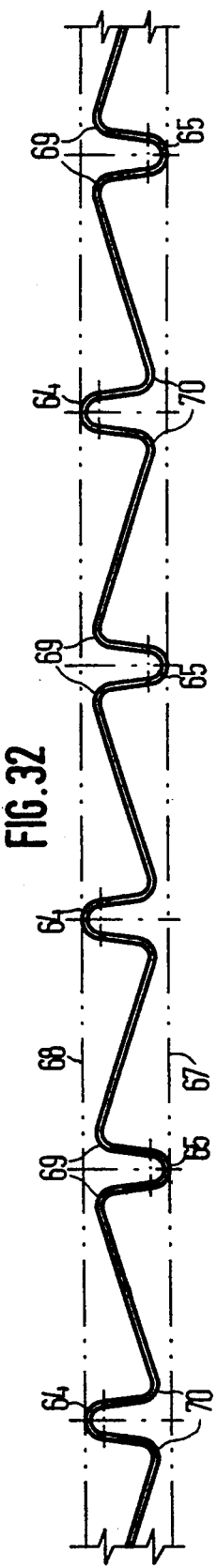
FIG. 32 A partial, stretched side view of the pretensioned spring in the lid closed position.
Figure 33:
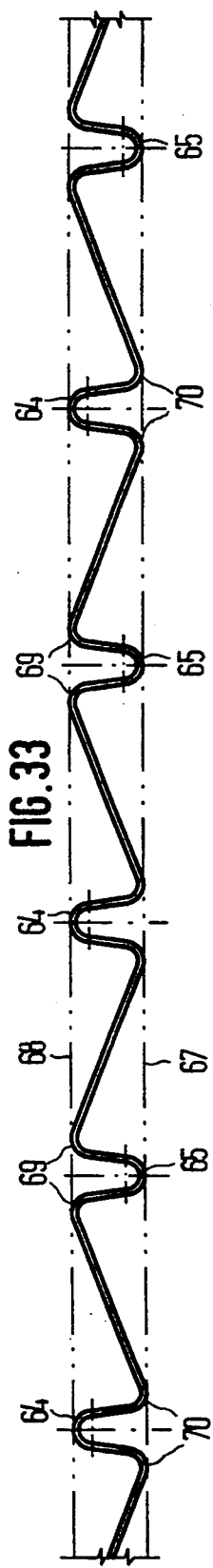
FIG. 33 A partial, stretched side view of the block-tensioned spring in the lid position.

FIGS. 25 and 32 show the springs 30"" in the pretensioned position corresponding to the lid closed position. FIGS. 29 and 33 show the springs 30" in the block-tensioned position corresponding to the lid open position. The block position of the springs 30" results from the simultaneous application of the bulges 64, 65 and the base roundnesses 69, 70 on the corresponding abutments, i.e. on the flange 67 or the channel 68.

Figure 34:
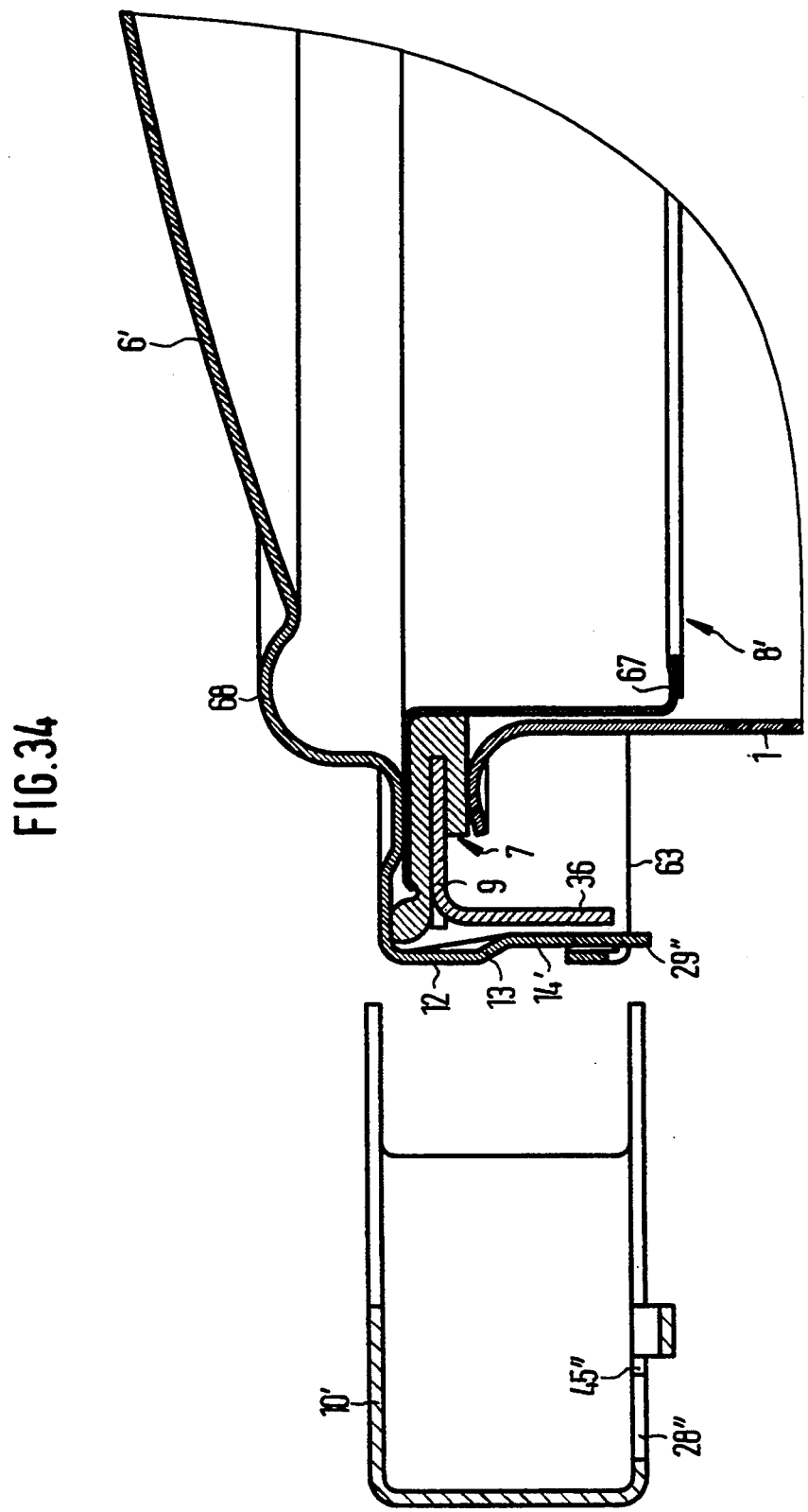
FIG. 34 A partial sectional view of the third embodiment similar to FIGS. 25 and 29 in the lid disassembly position.
Figure 35:
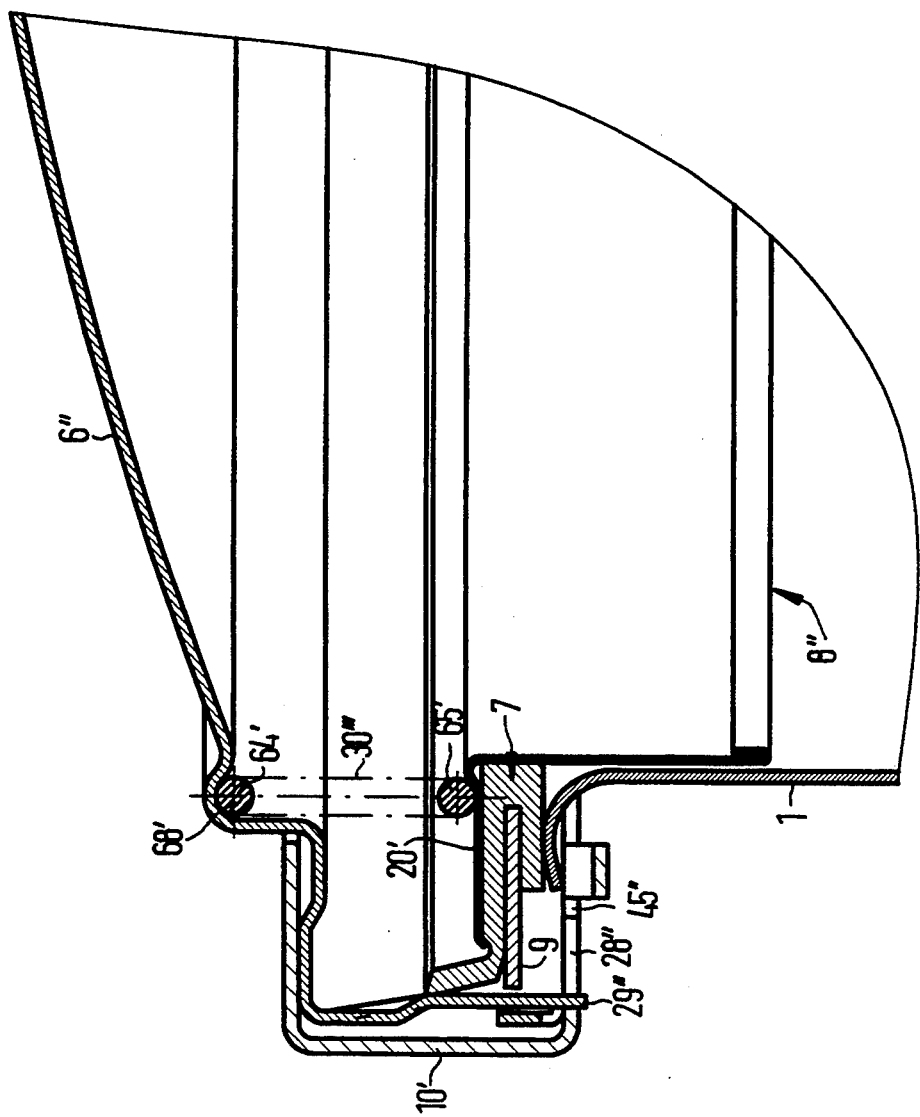
FIG. 35 A sectional view of the fourth embodiment similar to FIG. 25 with another variant of the spring used in the third embodiment.
Figure 36:
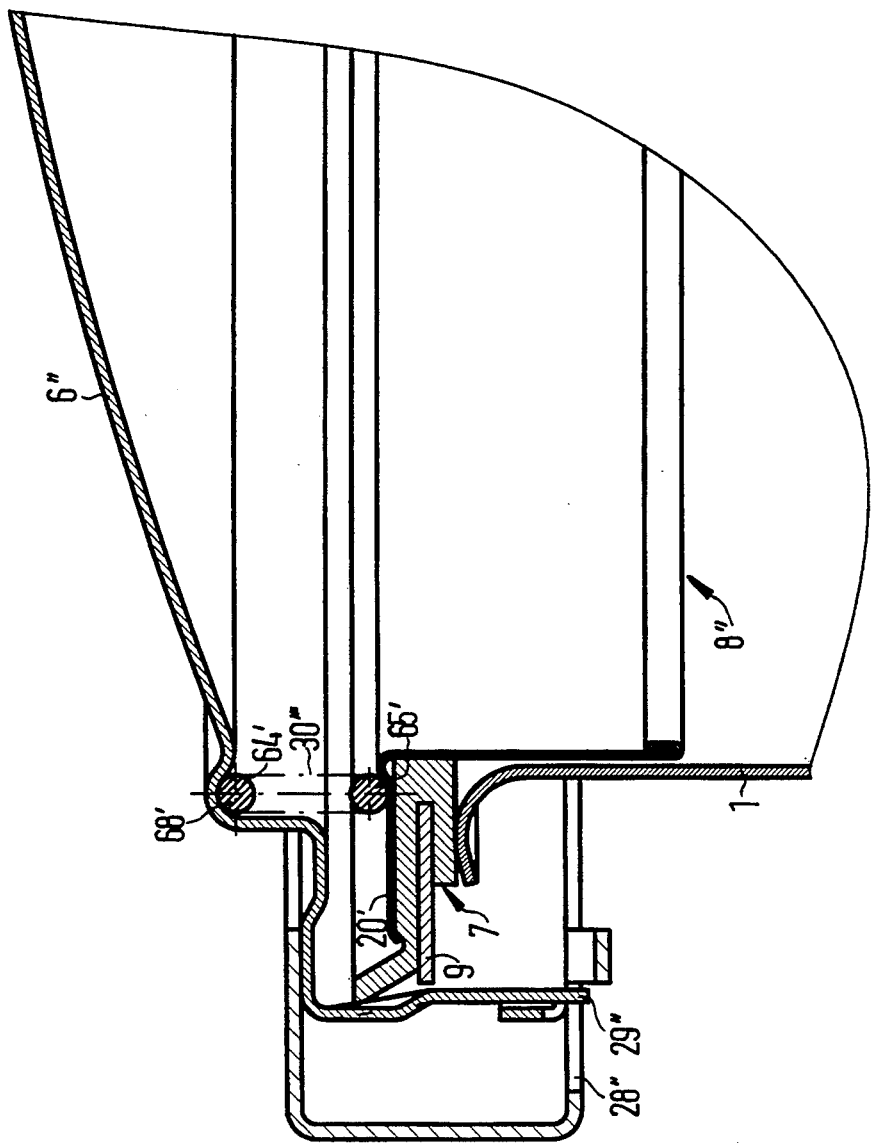
FIG. 36 A sectional view of the fourth embodiment similar to FIG. 29 with the spring variant according to FIG. 35.

To disassemble the lid 2, the spring 30" is inwardly removed over the flange 67 by elastically deformating of the spring 30". The dome 6' can then be pressed downwardly to stop engagement, at which point the clips 10' can be removed radially outwards. The further disassembly, like the assembly, takes place in the manner described hereinbefore. FIG. 34 shows that for disassembly purposes, instead of the lid being placed on a flat plate in the manner described hereinbefore it can be placed on the cooker 1.

FIGS. 35 to 38 show a modified embodiment of the pressure cooker of the invention with a spring variant. The spring 30'" has a smaller height compared with the spring 30" and is supported on abutments which, compared with the arrangement shown in FIGS. 25, 29 and 34, are further radially outwards with respect to the cooker center axis. The abutments are formed on the one hand by the channel 68' in the dome 6" and on the other by the flange 20' of the centering ring 8'".

It is to be understood that this invention in its broader aspects is not limited to the specific embodiments herein shown and described but departures may be made therefrom within the scope of the appended claims without departing from the principles of the invention and without sacrificing its chief advantages.

What is claimed is:

1. A pressure cooker comprising:
   a) a cooker bowl having a base and a cylindrical sidewall extending upwardly from said base and terminating in an outwardly extending circular pouring edge;
   b) a lid removably mountable on said pouring edge of said bowl, said lid having:
      i) a circular dome provided with a downwardly directed circumferential sidewall of a greater diameter than said pouring edge whereby said lid is axially movable with respect to said bowl;
      (ii) a centering ring positioned within the sidewall of said dome, said centering ring having a cylindrically sidewall and a flange extending radially outwardly from the top of said cylindrical sidewall, said cylindrical sidewall of said centering ring having a smaller diameter than the sidewall of said bowl and being locatable within said bowl, said flange having an outer diameter which is smaller than the inner diameter of the sidewall of said dome and being positioned to overlay said pouring edge when said centering ring is positioned in said bowl, said centering ring being axially movable within the sidewall of said dome between an open position at which said flange is proximal to said dome and a closed position at which said flange is located distally from said dome;
      (iii) an annular sealing ring fixed about the sidewall of said centering ring for movement therewith, said annular sealing ring having a first portion positioned below the radial flange of said centering ring and being adapted to seat against said pouring edge in response to pressure from within said bowl, said annular sealing ring having an upwardly extending sealing lip urgable in a sealing relation against the downwardly extending sidewall of said dome in response to internal pressure within said bowl when said lid is mounted on said bowl;
      (iv) downwardly directed closure elements fixed to said sealing ring, said closure elements extending between said sidewall of said dome and said pouring edge when said lid is mounted on said bowl;
      (v) a plurality of U-shaped clips mounted on said dome and being axially immobile therewith, each clip having a top leg and a bottom leg adapted to engage around said dome and said pouring edge, respectively, said clips being radially movable between a radially inward clipping position at which said lower leg engages around said pouring edge and a radially outward unclipping position at which said lower leg is free of said pouring edge,
      said clips being provided with guide elements adapted to slidably engage said closure elements when said lid is positioned on said bowl, said guide elements and said closure elements being configured to bias said clips towards their radially inward clipping position in response to movement of said centering ring towards its closed position, and to bias said clips towards their radially outward unclipping position in response to movement of said centering ring towards its open position;
      (vii) resilient means for normally biasing said centering ring axially away from said dome means, towards its closed position;
      (viii) disengagement means for eliminating the sealing engagement between said sealing lip and the sidewall of said dome in response to movement of said centering ring towards its open position;
      (ix) locking means for retaining said dome and centering ring together against the action of said resilient means, whereby the lid is released from the bowl by depressing the lid to move said centering ring towards its open position, thereby releasing the pressure within the bowl past the sealing lip as the clips are caused to move radially outwards by interaction between the closure elements and the guide elements on the clips to a position where the lower legs of the clips clear the pouring edge.

2. A pressure cooker according to claim 1 wherein said disengagement means comprises at least one inwardly extending web positioned on the inner surface of the sidewall of said dome.

3. A pressure cooker according to claim 1 wherein the sealing lip of said sealing ring extends upwards between the radial flange of said centering ring and the sidewall of said dome so that the inner surface of said sealing lip is exposable to internal pressure within said cooker.

4. A pressure cooker according to claim 1 wherein said sealing ring has an external circumferential groove in which is inserted a thrust ring, said thrust ring having an external circumference of a smaller diameter than the inner surface of the sidewall of said dome, said thrust ring supporting at least part of said sealing lip from below.

5. A pressure cooker according to claim 4 wherein said downwardly directed closure elements are fixed to said thrust ring.

6. A pressure cooker according to claim 1 wherein
   (a) said closure elements are constructed as plate-like, planar tongues oriented tangentially to the circumference of the dome means (b) each of said clips has a pair of guide elements in the form of guide slots positioned in the lower leg of said clip, the guide elements of an individual clip being oriented in an inwardly converging manner with respect to the cooker axis; and (c) a pair of said tongues are associated with each of said clips, each tongue of a respective pair of tongues having an inclined lower leg which converges towards the lower leg of the other tongue of a respective tongue pair, the tongues of a respective tongue pair being positioned to displaceably engage the guide slots in an associated clip.

7. A pressure cooker according to claim 1 further comprising a plurality of downwardly directed links fixed to the inner surface of said dome and a plurality of noses fixed to the inner surface of said centering ring, each of said links having a slot aligned in the axial direction of said cooker, each of said slots being adapted to slidably engage a different one of said noses and wherein said locking means comprising a locking recess within each of said slots which is engagable with a respective nose.

8. A pressure cooker according to claim 7 wherein said link slots each terminate at the top with an end recess into which an associated nose can move from the locking recess, whereby to disassemble the lid the centering ring can be urged towards the dome against the action of the resilient means until said closure elements disengage from said guide elements of said clips to allow said clips to be radially outwardly withdrawn from said dome.

9. A pressure cooker according to claim 7 wherein said resilient means comprises on each said link a coiled torsion spring having first and second ends, one of the ends engaged with pretension on a respective link and the other end on an associated nose.

10. A pressure cooker according to claim 7 wherein said resilient means further produces a transverse pressure for urging said noses into said locking recesses.

11. A pressure cooker according to claim 8 wherein each link slot has an inclined wall portion facing said locking recess, said inclined wall portion being adapted and arranged to coact with an associated nose during the opening displacement of the dome to cause a rotation between said dome and said centering ring until each nose engages in an associated locking recess.

12. A pressure cooker according to claim 8 wherein said resilient means comprises a plurality of springs, each spring being associated with a different one of said noses, each spring comprising two spaced, equiaxially juxtaposed helical torsion springs coiled in opposite directions and having facing inner spring legs which are inter-connected as one-piece by a wire bridge engaging an associated nose and outer spring legs which engage with pretension with an associated link.

13. A pressure cooker according to claim 12 wherein the inner spring legs and the outer spring legs, considered in the axial direction of the helical torsion springs are directed in converging manner to one another towards the associated link in the closed position.

14. A pressure cooker according to claim 1 further comprising:

(a) a plurality of downwardly directed noses uniformly and circumferentially distributed about the lower edge of the sidewall of said dome said noses corresponding in number to the number of said clips; and (b) a link slot formed in the lower leg of each clip, each nose engaging a slot in a different one of said clips, each slot including a latching recess forming said locking means in which is latchable an associated nose following a limited rotation of the dome relative to said clips when said clip are in their radially outer position.

15. A pressure cooker according to claim 1 further comprising an annular channel formed in said dome and wherein said resilient means is formed as a one-piece, annular spring, which is positioned coaxially to said centering ring, said spring having upwardly and downwardly extending deformations, said upward deformations seating in the annular channel of the dome and said downward deformations seating on said centering ring.

16. A pressure cooker according to claim 1, wherein said pouring edge of the cooker is formed with an upwardly directed, convex curvature, said curvature being disposed as to seat on a lower sealing surface of said sealing ring.

17. A pressure cooker as set forth in claim 1, wherein the sidewall of the dome has an increased diameter upper portion, and wherein said inwardly extending web is positioned in said increased diameter upper portion.

18. A pressure cooker according to claim 1 wherein said lid further comprises:
a handle fixedly and concentrically located on said dome means, and a venting and safety valve means for releasing pressure from said pressure cooker.

19. A pressure cooker comprising:
a) a cooker bowl having a base and a cylindrical sidewall extending upwardly from said base and terminating in an outwardly extending circular pouring edge; and
b) a lid removably mountable on said pouring edge of said bowl, said lid having:
   i) a circular dome provided with a downwardly directed circumferential sidewall of a greater diameter than said pouring edge whereby said lid is axially movable with respect to said bowl;
   (ii) a centering ring positioned within the sidewall of said dome, said centering ring having a cylindrically sidewall and a flange extending radially outwardly from the top of said cylindrical sidewall, said cylindrical sidewall of said centering ring having a smaller diameter than the sidewall of said bowl and being locatable within said bowl, said flange having an outer diameter which is smaller than the inner diameter of the sidewall of said dome and being positioned to overlay said pouring edge when said centering ring is positioned in said bowl, said centering ring being axially movable within the sidewall of said dome between an open position at which said flange is proximal to said dome and a closed position at which said flange is located distally from said dome;
   (iii) an annular sealing ring fixed about the sidewall of said centering ring for movement therewith, said annular sealing ring having a first portion positioned below the radial flange of said centering ring and being adapted to seat against said pouring edge in response to pressure from within said bowl, said annular sealing ring having an upwardly extending sealing lip urgable in a sealing relation against the downwardly extending sidewall of said dome in response to internal pressure within said bowl when said lid is mounted on said bowl;

(iv) resilient means for normally biasing said centering ring axially away from said dome means, towards its closed position; and (v) disengagement means for eliminating the sealing engagement between said sealing lip and the sidewall of said dome in response to movement of said centering ring towards its open position.

20. A pressure cooker comprising:

a) a cooker bowl having a base and a cylindrical sidewall extending upwardly from said base and terminating in an outwardly extending circular pouring edge; and b) a lid removably mountable on said pouring edge of said bowl, said lid having:

i) a circular dome provided with a downwardly directed circumferential sidewall of a greater diameter than said pouring edge whereby said lid is axially movable with respect to said bowl;

(ii) a centering ring positioned within the sidewall of said dome, said centering ring having a cylindrically sidewall and a flange extending radially outwardly from the top of said cylindrical sidewall, said cylindrical sidewall of said centering ring having a smaller diameter than the sidewall of said bowl and being locatable within said bowl, said flange having an outer diameter which is smaller than the inner diameter of the sidewall of said dome and being positioned to overlay said pouring edge when said centering ring is positioned in said bowl, said centering ring being axially movable within the sidewall of said dome between an open position at which said flange is proximal to said dome and a closed position at which said flange is located distally from said dome;

(iii) a plurality of clips mounted on said dome and being adapted to engage around said dome and said pouring edge, said clips being movable between a clipping position at which said clip engages around said pouring edge and said dome and an unclipping position at which clip is disengaged from said pouring edge; and (iv) means for biasing said clips towards their radially inward clipping position in response to movement of said centering ring towards its closed position, and for biasing said clips towards their radially outward unclipping position in response to movement of said centering ring towards its open position.

* * * * *